US012677058B2

(12) United States Patent
Takanashi

(10) Patent No.: US 12,677,058 B2
(45) Date of Patent: Jul. 7, 2026

(54) ELECTRONIC DEVICE, AND CONTROL METHOD OF ELECTRONIC DEVICE

(71) Applicant: CANON KABUSHIKI KAISHA, Tokyo (JP)

(72) Inventor: Hideya Takanashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 18/654,412

(22) Filed: May 3, 2024

(65) Prior Publication Data

US 2024/0397190 A1 Nov. 28, 2024

(30) Foreign Application Priority Data

May 26, 2023 (JP) ................................. 2023-087182

(51) Int. Cl.
*H04N 23/611* (2023.01)
*H04N 23/63* (2023.01)
*H04N 23/67* (2023.01)

(52) U.S. Cl.
CPC ......... *H04N 23/611* (2023.01); *H04N 23/632* (2023.01); *H04N 23/675* (2023.01)

(58) Field of Classification Search
CPC .. H04N 23/611; H04N 23/675; H04N 23/632; H04N 23/61
USPC .................................................. 348/333.03
See application file for complete search history.

(56) References Cited

U.S. PATENT DOCUMENTS

| | | | | |
|---|---|---|---|---|
| 11,442,244 | B2 * | 9/2022 | Kojima | G02B 7/287 |
| 11,632,496 | B2 * | 4/2023 | Horie | H04N 23/675 |
| | | | | 348/222.1 |
| 11,665,438 | B2 * | 5/2023 | Tamaki | G06F 3/013 |
| | | | | 348/222.1 |
| 12,401,892 | B2 * | 8/2025 | Nishimura | H04N 23/675 |
| 2021/0258477 | A1 * | 8/2021 | Tamaki | G06F 3/013 |
| 2021/0302692 | A1 * | 9/2021 | Kojima | G03B 13/36 |
| 2022/0019789 | A1 * | 1/2022 | Mori | G06V 40/18 |
| 2022/0124243 | A1 * | 4/2022 | Takei | H04N 23/632 |
| 2022/0272277 | A1 * | 8/2022 | Mori | H04N 23/635 |
| 2022/0394187 | A1 * | 12/2022 | Ebata | H04N 23/611 |
| 2023/0328357 | A1 * | 10/2023 | Ogawa | H04N 23/667 |
| | | | | 396/51 |
| 2023/0345114 | A1 * | 10/2023 | Nishimura | H04N 23/675 |

FOREIGN PATENT DOCUMENTS

| JP | H0915483 A | 1/1997 |
|---|---|---|
| JP | 2021131441 A | 9/2021 |

* cited by examiner

*Primary Examiner* — Pritham D Prabhakher
(74) *Attorney, Agent, or Firm* — Cowan, Liebowitz & Latman, P.C.

(57) ABSTRACT

An electronic device according to the present invention includes: a processor, and a memory storing a program which, when executed by the processor, causes the electronic device to obtain information on a line-of-sight position of a user looking at a captured image, estimate, on a basis of the line-of-sight position of the user, an object to which a line of sight of the user is directed, and control, on a basis of at least one of a state of capturing the image or a state of an object in the image, whether to display a first item that indicates the estimated object.

15 Claims, 20 Drawing Sheets

*FIG. 2*
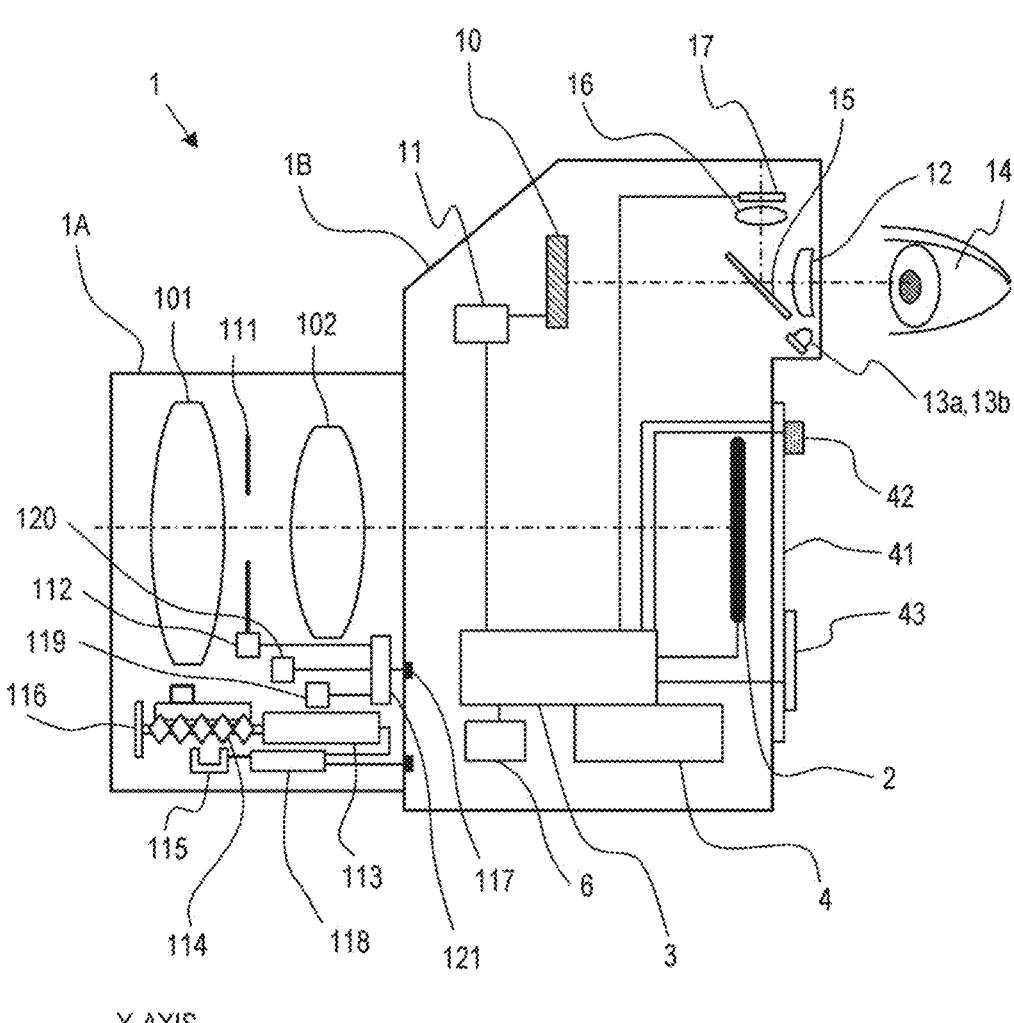
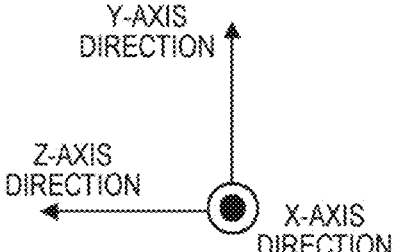
Y-AXIS
DIRECTION
Z-AXIS
DIRECTION
X-AXIS
DIRECTION

Figure 8B:
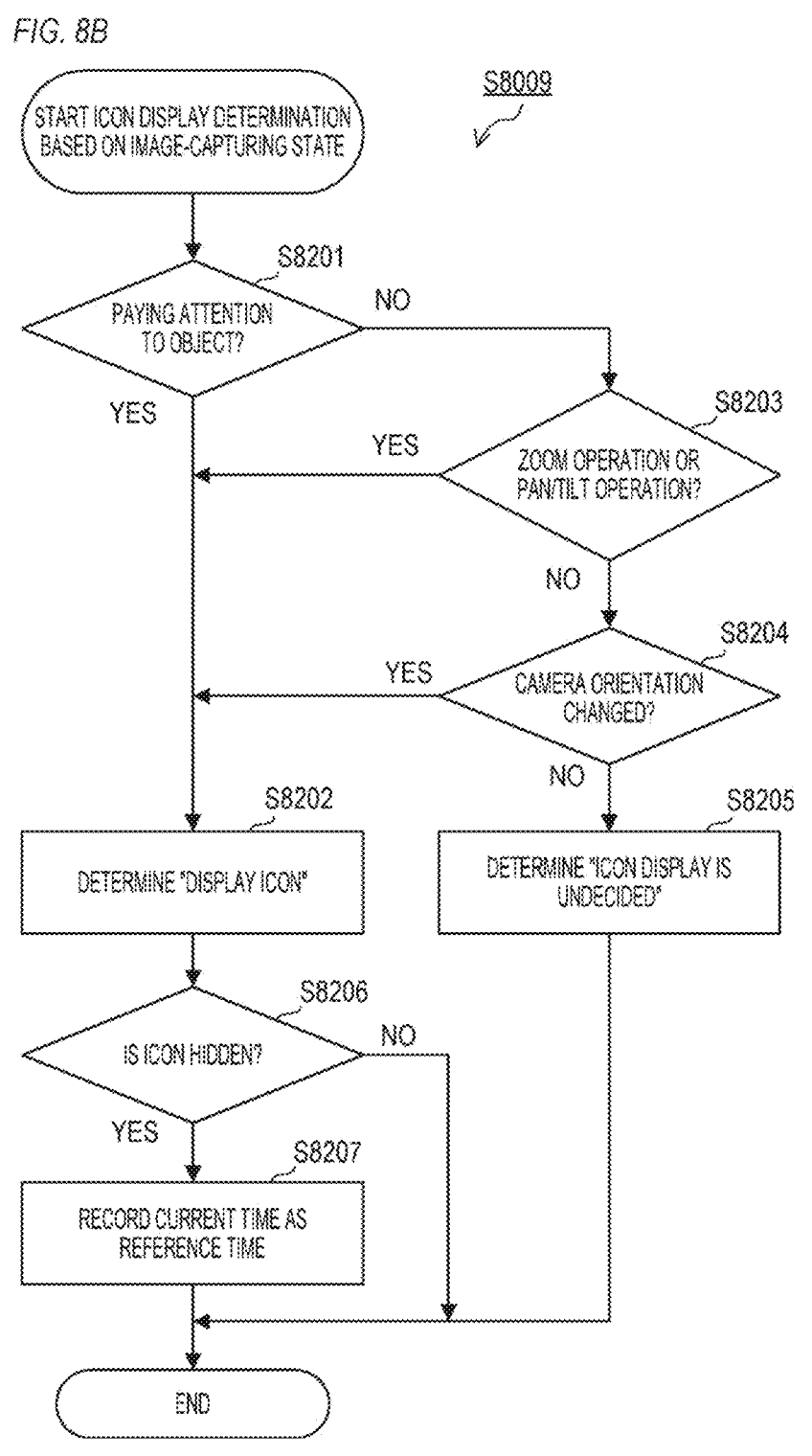

```
┌─────────────────────────────────┐
│ START ICON DISPLAY DETERMINATION │
│   BASED ON IMAGE-CAPTURING STATE │
└─────────────────────────────────┘
                │
                ▼
         S8201
    ╱─────────────────╲                        NO
   ╱   PAYING ATTENTION ╲ ──────────────────────────┐
   ╲     TO OBJECT?      ╱                           │
    ╲─────────────────╱                             ▼
            │ YES                            S8203
            │                        ╱──────────────────╲
            │              YES      ╱  ZOOM OPERATION OR  ╲
            │ ◄────────────────────╲   PAN/TILT OPERATION? ╱
            │                       ╲──────────────────╱
            │                                │ NO
            │                                ▼
            │                          S8204
            │                  ╱──────────────────╲
            │        YES      ╱  CAMERA ORIENTATION ╲
            │ ◄──────────────╲     CHANGED?         ╱
            │                 ╲──────────────────╱
            │                          │ NO
            ▼  S8202                   ▼  S8205
  ┌──────────────────────┐   ┌──────────────────────┐
  │ DETERMINE "DISPLAY   │   │ DETERMINE "ICON DISPLAY│
  │      ICON"           │   │     IS UNDECIDED"     │
  └──────────────────────┘   └──────────────────────┘
            │                          │
            ▼  S8206                   │
    ╱─────────────────╲     NO         │
   ╱   IS ICON HIDDEN? ╲ ──────────┐   │
   ╲                   ╱           │   │
    ╲─────────────────╱            │   │
            │ YES                  │   │
            ▼  S8207               │   │
  ┌──────────────────────┐        │   │
  │ RECORD CURRENT TIME AS│        │   │
  │    REFERENCE TIME     │        │   │
  └──────────────────────┘        │   │
            │                      │   │
            ▼ ◄────────────────────┘◄──┘
      ┌──────────┐
      │   END    │
      └──────────┘
```

Figure 8C:
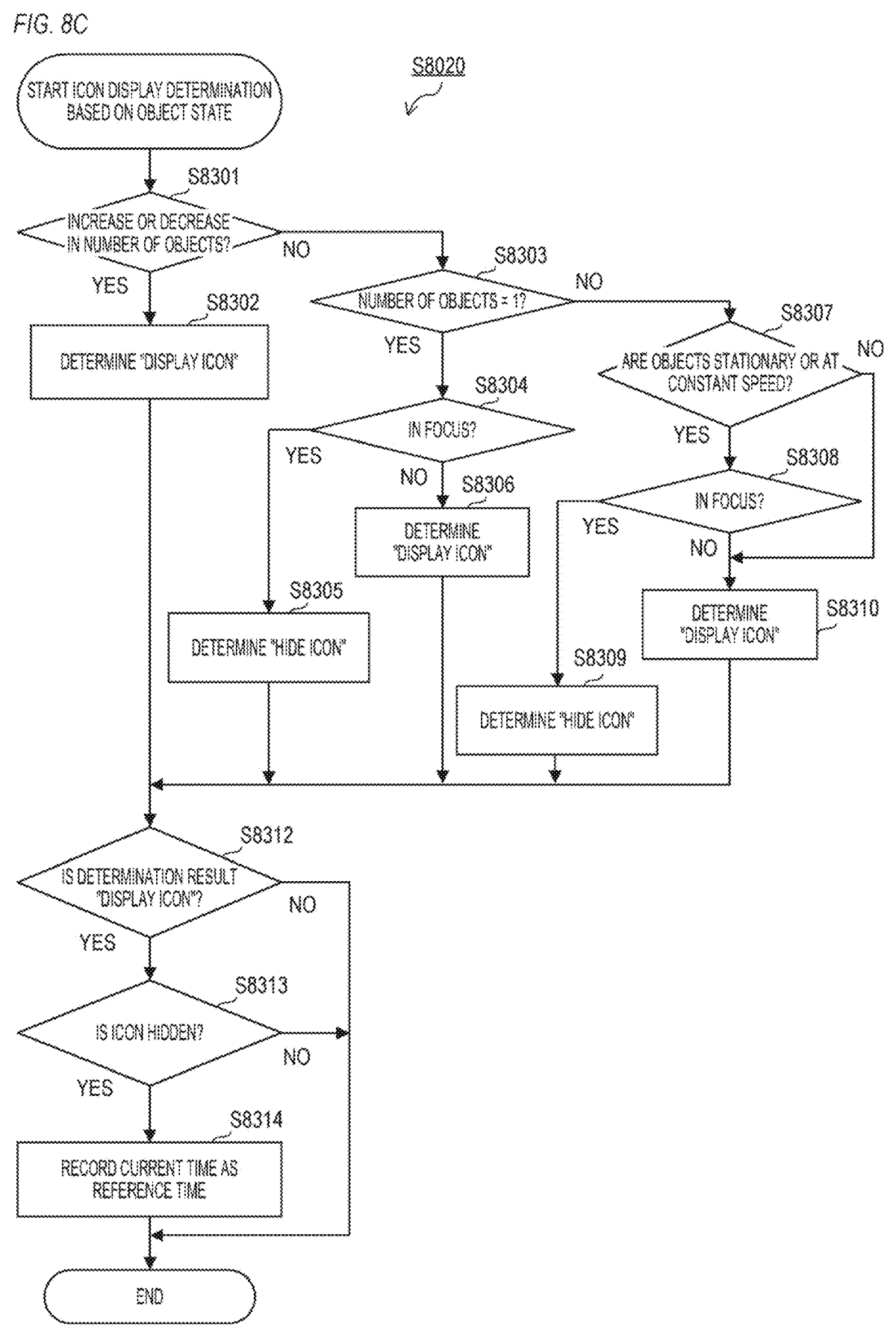

START ICON DISPLAY DETERMINATION
BASED ON OBJECT STATE

S8301

INCREASE OR DECREASE
IN NUMBER OF OBJECTS? — NO

YES

S8302

DETERMINE "DISPLAY ICON"

S8303

NUMBER OF OBJECTS = 1? — NO

YES

S8307

ARE OBJECTS STATIONARY OR AT
CONSTANT SPEED? — NO

YES

S8304

IN FOCUS?

YES          NO          S8306

DETERMINE
"DISPLAY ICON"

S8308

IN FOCUS?

YES          NO

S8305

DETERMINE "HIDE ICON"

S8310

DETERMINE
"DISPLAY ICON"

S8309

DETERMINE "HIDE ICON"

S8312

IS DETERMINATION RESULT
"DISPLAY ICON"? — NO

YES

S8313

IS ICON HIDDEN? — NO

YES

S8314

RECORD CURRENT TIME AS
REFERENCE TIME

END

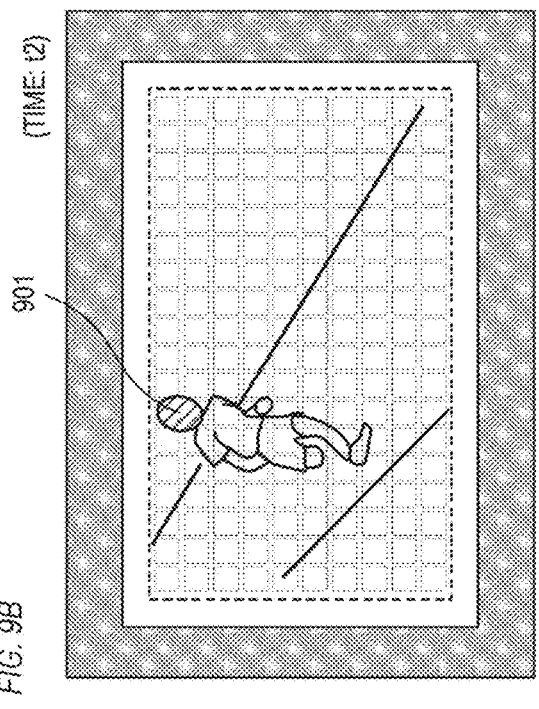
FIG. 9A    (TIME: t1)
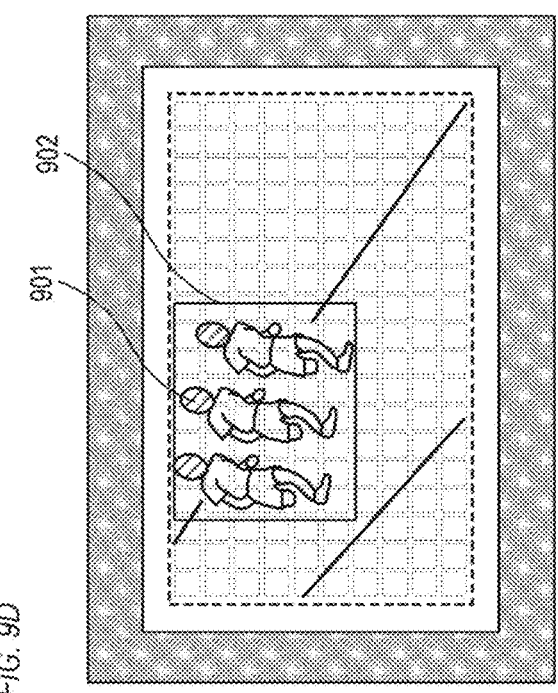
FIG. 9B    (TIME: t2)
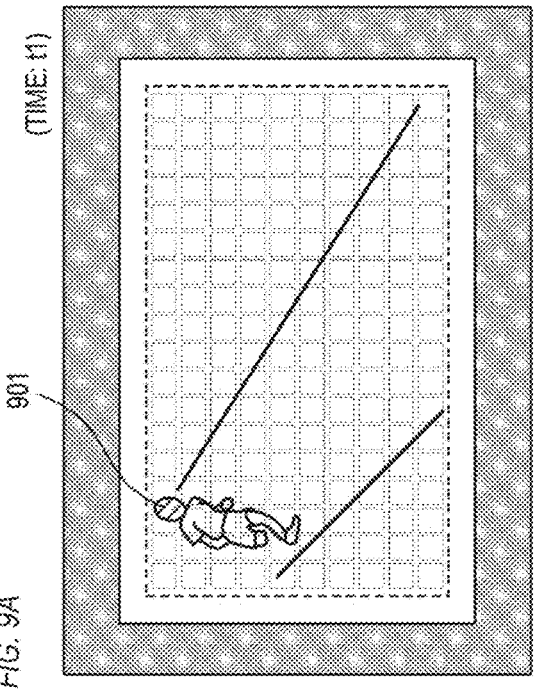
FIG. 9C    (TIME: t3)
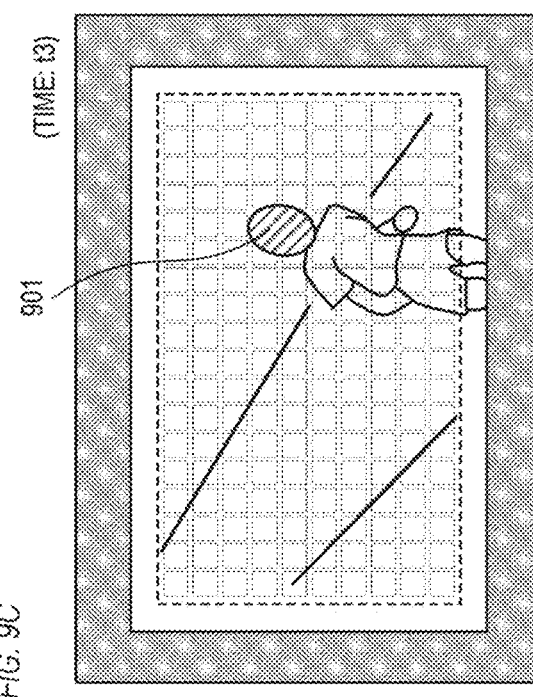
FIG. 9D 1202    1201

1202

1201

1203

*FIG. 13A*     1301     1302     (TIME: t11)
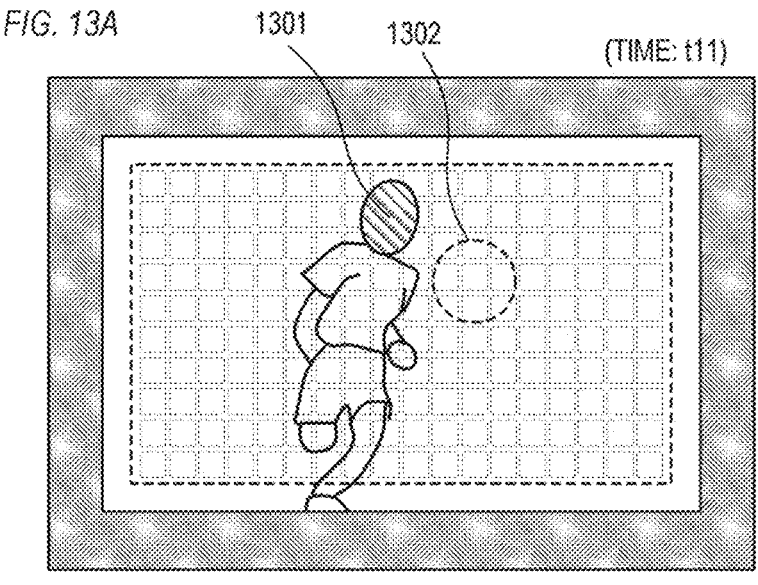
*FIG. 13B*     1301   1304   1303    (TIME: t12)
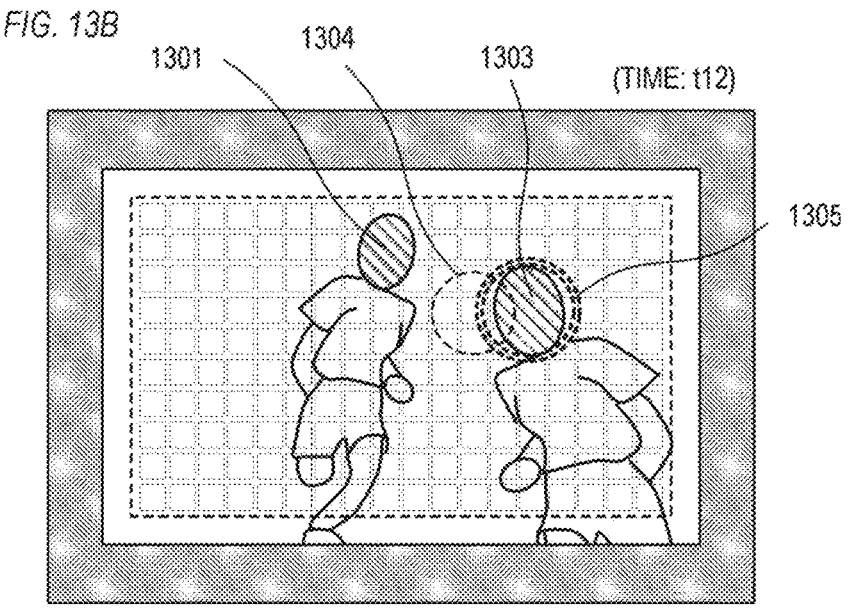
1305

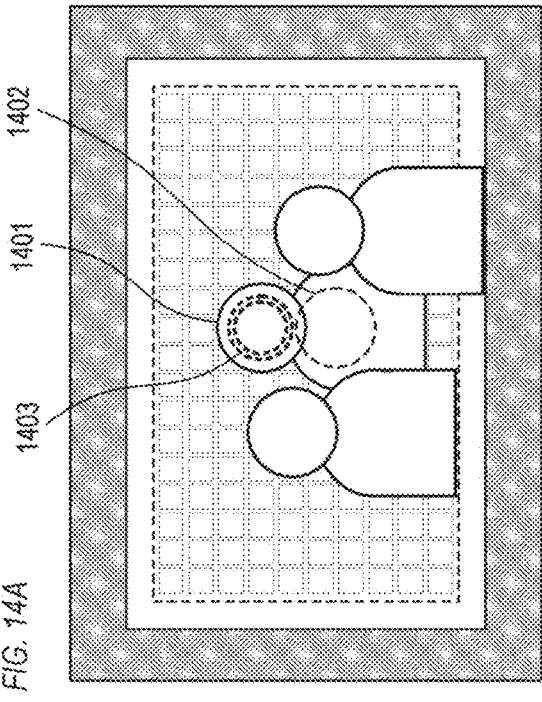
FIG. 14A
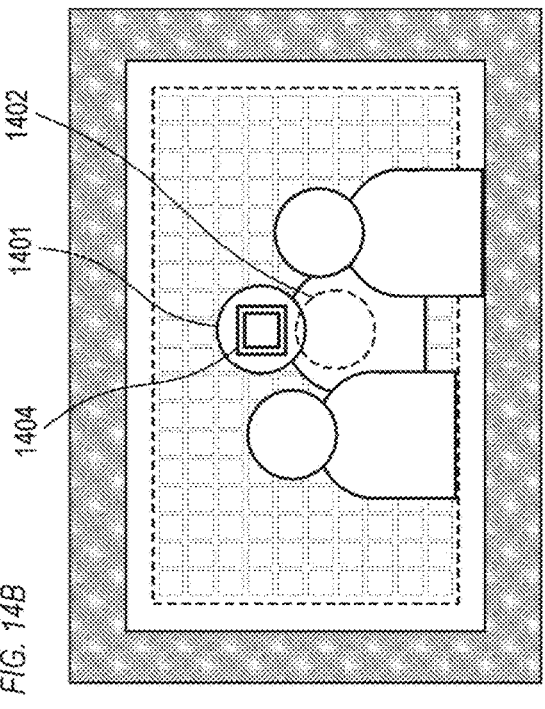
FIG. 14B
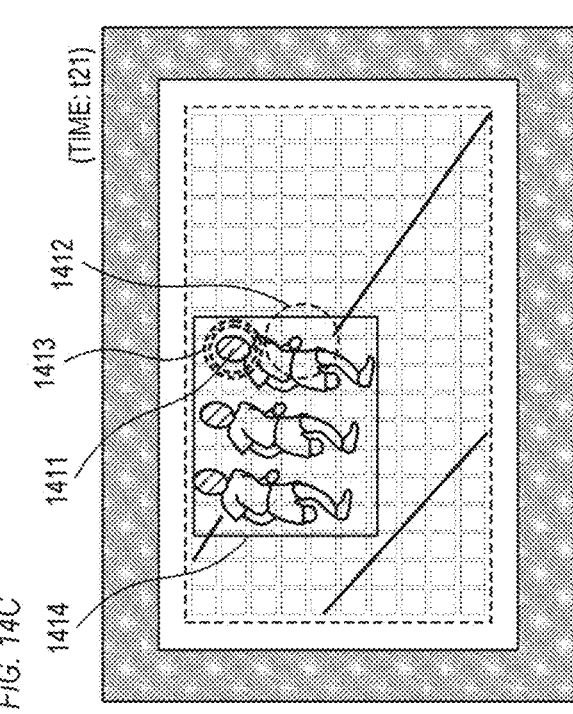
FIG. 14C    (TIME: t21)
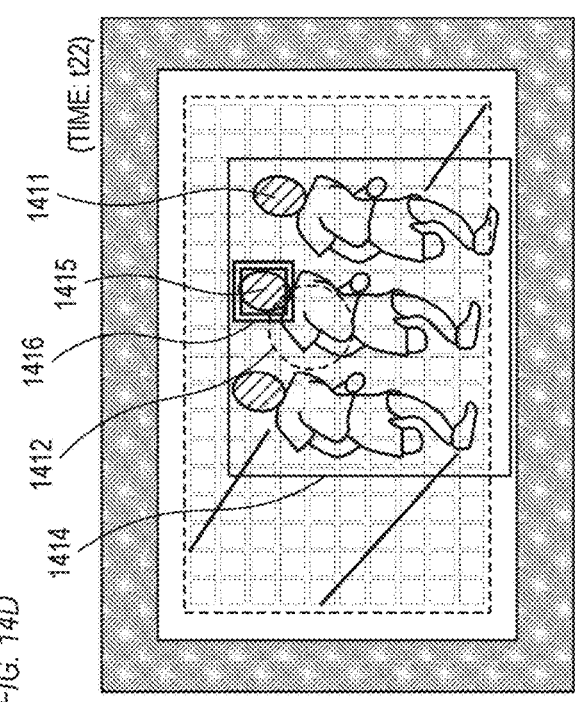
FIG. 14D    (TIME: t22)

ELECTRONIC DEVICE, AND CONTROL METHOD OF ELECTRONIC DEVICE

BACKGROUND OF THE INVENTION

Field of the Invention

The present invention relates to an electronic device, and a control method of an electronic device.

Description of the Related Art

Conventionally, image-capturing devices have been provided that have a function of detecting the line-of-sight position of a user looking into the field of view of the viewfinder. Also, in recent years, image-capturing devices have been provided that include electronic viewfinders, which can display images obtained by imaging elements that receive light beams that have passed through photographic optical systems. Image-capturing devices having an electronic viewfinder are capable of identifying and detecting various types of objects. Such image-capturing devices can perform focus detection control at an object position that reflects the user's intention, on the basis of information on a detected line-of-sight position and the identification result of the object in an obtained image.

Japanese Patent Application Publication No. 2021-131441 discloses a technique for suitably controlling the display state of the line-of-sight position in a case where line-of-sight detection is to be prioritized and a case where the display in the viewfinder is to be prioritized, depending on the state of the autofocus (hereinafter referred to as AF) function. Japanese Patent Application Publication No. 09-015483 discloses a technique for appropriately setting a predetermined time used to determine the fixation of line of sight in a case, where when the user's line of sight is fixed for a predetermined time or longer in the viewfinder, a corresponding function is activated.

However, in an actual shooting scene, it is preferable that the display of the line-of-sight position, AF frame, and the like be appropriately controlled in consideration of visibility and user operability. For example, in a case that uses information on the line-of-sight position to determine the AF target area (AF frame), even if the fixation time of the line of sight before displaying the AF frame is set in advance, the display state of the AF frame is not necessarily changed in a timely manner for the user.

SUMMARY OF THE INVENTION

In view of the above, the present invention provides an electronic device that not only achieves the display of a line-of-sight position but also assures image visibility.

The present invention in its first aspect provides an electronic device including: a processor; and a memory storing a program which, when executed by the processor, causes the electronic device to obtain information on a line-of-sight position of a user looking at a captured image, estimate, on a basis of the line-of-sight position of the user, an object to which a line of sight of the user is directed, and control, on a basis of at least one of a state of capturing the image or a state of an object in the image, whether to display a first item that indicates the estimated object.

The present invention in its second aspect provides a control method of an electronic device, the control method including: obtaining information on a line-of-sight position of a user looking at a captured image, estimating, on a basis of the line-of-sight position of the user, an object to which a line of sight of the user is directed, and controlling, on a basis of at least one of a state of capturing the image or a state of an object in the image, whether to display a first item that indicates the estimated object.

The present invention in its third aspect provides a non-transitory computer readable medium that stores a program, wherein the program causes a computer to execute a control method of an electronic device, the control method including: obtaining information on a line-of-sight position of a user looking at a captured image, estimating, on a basis of the line-of-sight position of the user, an object to which a line of sight of the user is directed, and controlling, on a basis of at least one of a state of capturing the image or a state of an object in the image, whether to display a first item that indicates the estimated object.

Further features of the present invention will become apparent from the following description of exemplary embodiments with reference to the attached drawings.

BRIEF DESCRIPTION OF THE DRAWINGS

FIG. 2 is a diagram showing an example of the internal configuration of the camera;

FIG. 8B is a flowchart of an icon display determination process based on the image-capturing state;

FIG. 8C is a flowchart of an icon display determination process based on the object state;

FIGS. 9A to 9D are diagrams illustrating motion information of objects;

FIGS. 13A and 13B are diagrams illustrating icon display based on a change in the number of objects;

FIGS. 14A to 14D are diagrams illustrating icon display based on object motion information;

DESCRIPTION OF THE EMBODIMENTS

First Embodiment

Referring to the accompanying drawings, an embodiment according to the present invention is now described.

Description of Configuration

Figures 1A, 1B:
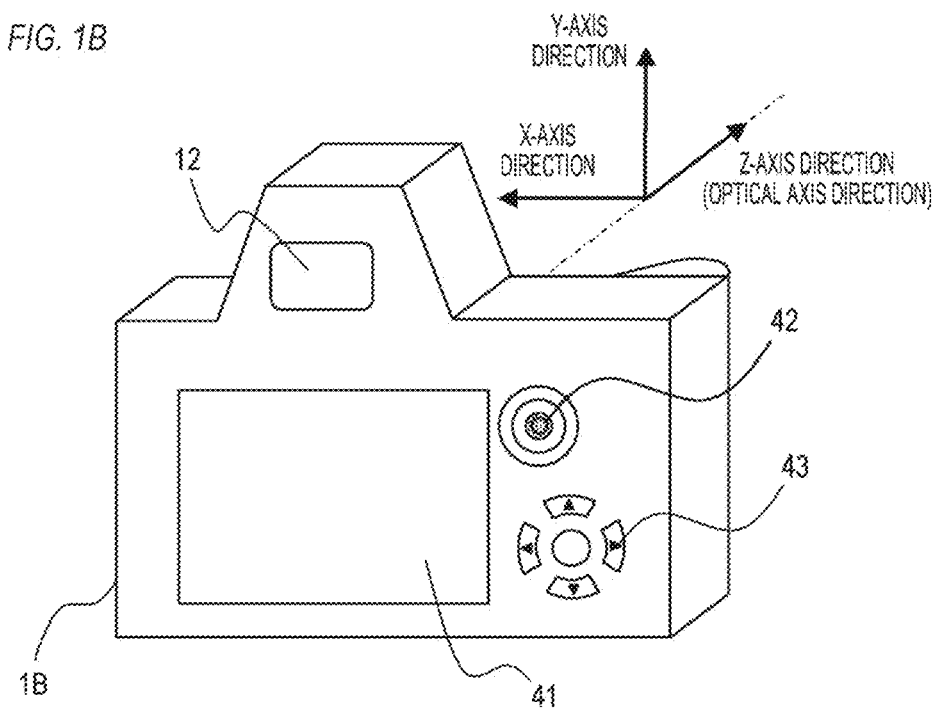
FIGS. 1A and 1B are diagrams showing an example of the appearance of a camera.

Referring to FIGS. 1A, 1B to 3, an example of a camera configuration is described. FIGS. 1A and 1B show an example of the appearance of a camera 1 (digital still camera; camera with interchangeable lens) according to the present embodiment. FIG. 1A is a front perspective view, and FIG. 1B is a back perspective view. As shown in FIG. 1A, the camera 1 has a photographic lens unit 1A and a camera housing 1B. The camera housing 1B includes a release button 5, which is an operation member capable of receiving a shooting operation of a user (photographer).

As shown in FIG. 1B, the back side of the camera housing 1B includes an eyepiece 12 (eyepiece optical system), through which the user looks into a display device 10 (display panel) in the camera housing 1B. The eyepiece optical system may include multiple lenses. The back side of the camera housing 1B also includes operation members 41 to 43, which are capable of receiving various operations from the user. For example, the operation member 41 is a touch panel that is capable of receiving touch operations, the operation member 42 is an operation lever that can be pressed to tilt in different directions, and the operation member 43 is a four-way key that can be pushed for four directions. The operation member 41 (touch panel) includes a display panel such as a liquid crystal panel, and has a function of displaying images on the display panel.

FIG. 2 is a cross-sectional view of the camera 1 taken along a YZ plane along the Y-axis and the Z-axis shown in FIG. 1A, showing an example of the internal configuration of the camera 1. In FIG. 2, the same components as in FIGS. 1A and 1B are designated by the same reference numerals.

The photographic lens unit 1A includes two lenses 101 and 102, a diaphragm 111, a diaphragm drive unit 112, a lens drive motor 113, a lens drive member 114, a photocoupler 115, a pulse plate 116, a mount contact 117, and a focus-adjusting circuit 118. The photographic lens unit 1A also includes an acceleration sensor 119, a zoom drive unit 120, and a lens CPU 121. Although two lenses 101 and 102 are shown for simplicity, the photographic lens unit 1A actually includes more than two lenses. The lens CPU 121 controls each component of the photographic lens unit 1A.

The diaphragm drive unit 112 drives the diaphragm 111 provided in the photographic lens unit 1A. The lens drive member 114 includes a drive gear and the like. The photo-coupler 115 detects the rotation of the pulse plate 116, which is interlocked with the lens drive member 114, and transmits the rotation to the focus-adjusting circuit 118. On the basis of information from the photocoupler 115 and information from the camera housing 1B (information on lens drive amount), the focus-adjusting circuit 118 drives the lens drive motor 113 and moves the lens 101 to change the focus position. The mount contact 117 is an interface between the photographic lens unit 1A and the camera housing 1B.

The acceleration sensor 119 is in the photographic lens unit 1A and detects panning of the lenses 101 and 102. The acceleration sensor 6 is in the camera housing 1B and detects panning of the camera housing 1B. Panning of the camera 1 is determined using at least one of the acceleration sensor 119 in the photographic lens unit 1A or the acceleration sensor 6 in the camera housing 1B.

The zoom drive unit 120 performs zoom drive on the basis of a user's manual operation on an operation member provided on the lens barrel (not shown), or performs zoom drive in response to an instruction from the camera housing 1B given via the mount contact 117. The lens CPU 121 notifies the camera housing 1B of zoom drive information from the photographic lens unit 1A via the mount contact 117. The zoom drive information allows the camera 1 to detect a change in the angle of view caused by the zoom operation.

The camera housing 1B includes an imaging element 2, a CPU 3, a memory unit 4, a display device 10, a display-device drive circuit 11, and the like. The imaging element 2 is disposed on the intended imaging plane of the photographic lens unit 1A. The CPU 3 is a central processing unit of a microcomputer and controls the entire camera 1. The memory unit 4 stores images captured by the imaging element 2, for example. The display device 10 may be configured with a liquid crystal or the like, and displays a captured image (object image) on the display surface of the display device 10, for example. The display-device drive circuit 11 drives the display device 10. The user can view the image displayed on the display surface of the display device 10 (such as an image captured by the imaging element 2) through the eyepiece 12.

The camera housing 1B also includes an eyepiece 12, light sources 13a and 13b, a light splitter 15, a light-receiving lens 16, an eye imaging element 17, and the like. The light sources 13a and 13b are light sources for illuminating an eyeball 14 of the user. The light sources 13a and 13b are used in single-lens reflex cameras, for example, to detect the line-of-sight direction (direction of the line of sight: direction of the user's gaze) from the relationship between the pupil and a reflection image (corneal reflection image; Purkinje image) generated by corneal reflection of light. Specifically, each of the light sources 13a and 13b is an infrared light-emitting diode or the like that emits infrared light, which is not sensed by the user, and is arranged around the eyepiece 12.

An optical image of the illuminated eyeball 14 (eyeball image; image generated by reflected light emitted from the light sources 13a and 13b and reflected on the eyeball 14) passes through the eyepiece 12 and is reflected on the light splitter 15. The light-receiving lens 16 then forms an eyeball image on the eye imaging element 17, which may be a CCD, CMOS, or the like, and includes two-dimensionally arranged photoelectric elements. The light-receiving lens 16 positions the pupil of the eyeball 14 and the eye imaging element 17 in a conjugate image-forming relationship. A predetermined algorithm is used to detect the line-of-sight direction of the eyeball 14 from the positional relationship between the pupil and the corneal reflection image in the eyeball image formed on the eye imaging element 17.

Figure 3:
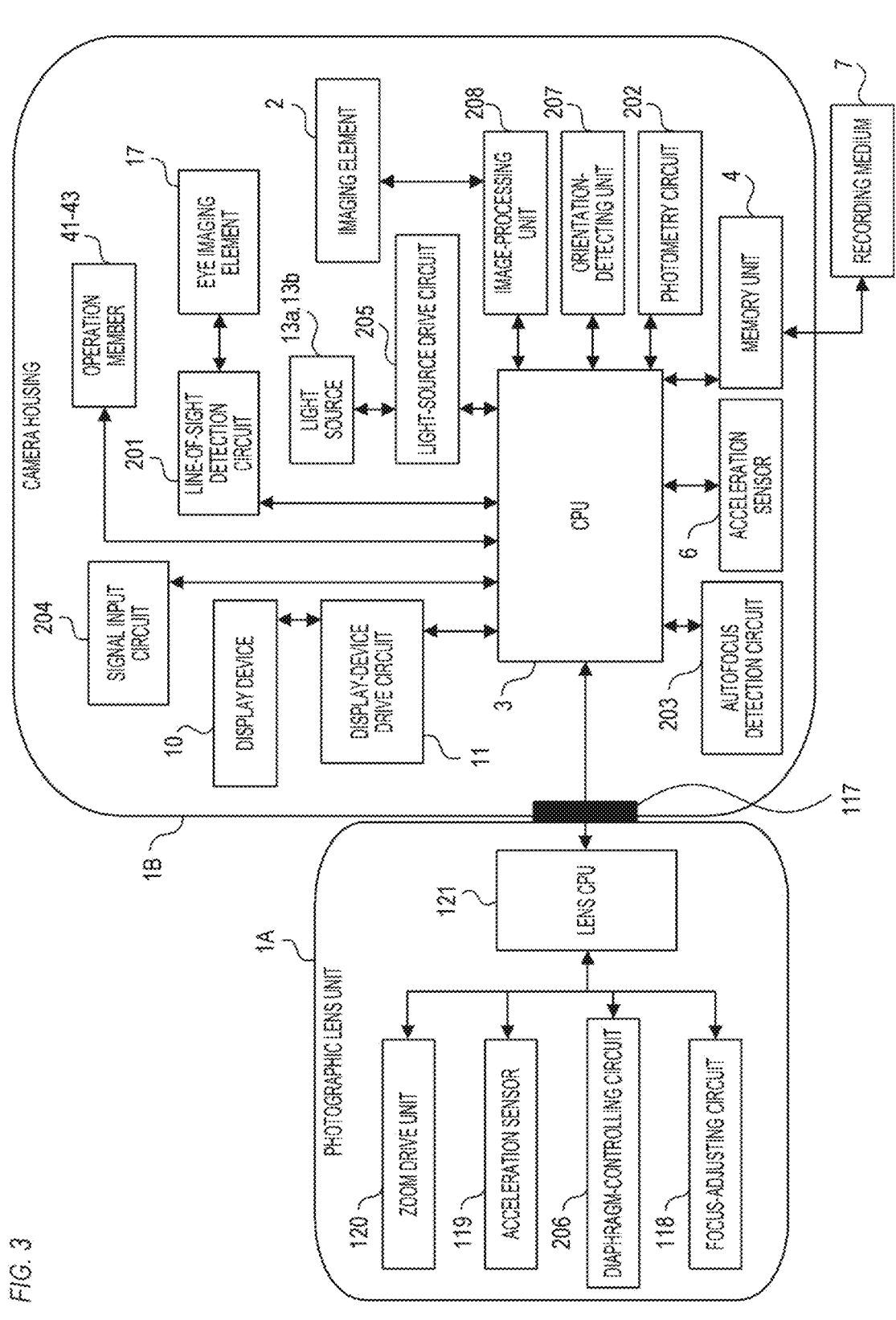
FIG. 3 is a block diagram showing an example of the electrical configuration within the camera.

FIG. 3 is a block diagram showing an example of the electrical configuration within the camera 1. In FIG. 3, the same components as in FIGS. 1A, 1B, and 2 are designated by the same reference numerals, and detailed descriptions of these components are omitted. The CPU 3 is connected to a line-of-sight detection circuit 201, a photometry circuit 202, an automatic focus detection circuit 203, a signal input circuit 204, a display-device drive circuit 11, a light-source drive circuit 205, an acceleration sensor 6, a memory unit 4, an image-processing unit 208, and an orientation-detecting unit 207.

The CPU 3 transmits signals to the lens CPU 121 via the mount contact 117. On the basis of signals from the CPU 3, the lens CPU 121 controls the focus-adjusting circuit 118, a diaphragm-controlling circuit 206 in the diaphragm drive unit 112, the acceleration sensor 119, and the zoom drive unit 120, which are in the photographic lens unit 1A.

The memory unit 4 associated with the CPU 3 has a function of storing imaging signals from the imaging element 2 and the eye imaging element 17. The CPU 3 converts the imaging signal of the imaging element 2 stored in the memory unit 4 into a captured image, and transfers the converted captured image to a recording medium 7 connected to the memory unit 4.

The orientation-detecting unit 207 detects orientation information of the user holding the camera 1. The orientation-detecting unit 207 can detect the orientation information of the user using the acceleration sensor 6, for example. The camera 1 is capable of shooting in a normal position (horizontal position) in which the imaging element 2 is horizontal with respect to the object, and in a vertical position in which the imaging element 2 is vertical with respect to the object. The orientation-detecting unit 207 can detect a change in the orientation of the camera 1 even when the user changes the orientation of the camera 1 while looking into the viewfinder.

The line-of-sight detection circuit 201 performs analog-to-digital conversion on the output (eye image of an eye) produced by the eye imaging element 17 while an eyeball image is formed on the eye imaging element 17. The result of the conversion is sent to the CPU 3. The CPU 3 extracts feature points used for line-of-sight detection from the eye image according to a predetermined algorithm, and determines the user's gaze point (line-of-sight position; position to which line of sight is directed; position where the user is looking) on the display surface of the display device 10.

A photometry circuit 202 performs processing such as amplification, logarithmic compression, and A/D conversion on the signal obtained from the imaging element 2, which also serves as a photometric sensor. Specifically, this signal is a brightness signal corresponding to the brightness of the object field. The result of the processing is sent to the CPU 3 as field brightness information. The field brightness information indicates the brightness of each pixel of the captured image. The photometry circuit 202 also detects a specific object from the image captured by the imaging element 2, and sends the result to the CPU 3 as object information and object area information. The object information (object information) relates to the detected object, and the object area information (object area information) indicates the area of the detected object. The object information and object area information can also be obtained by analyzing field brightness information.

Figure 4A:
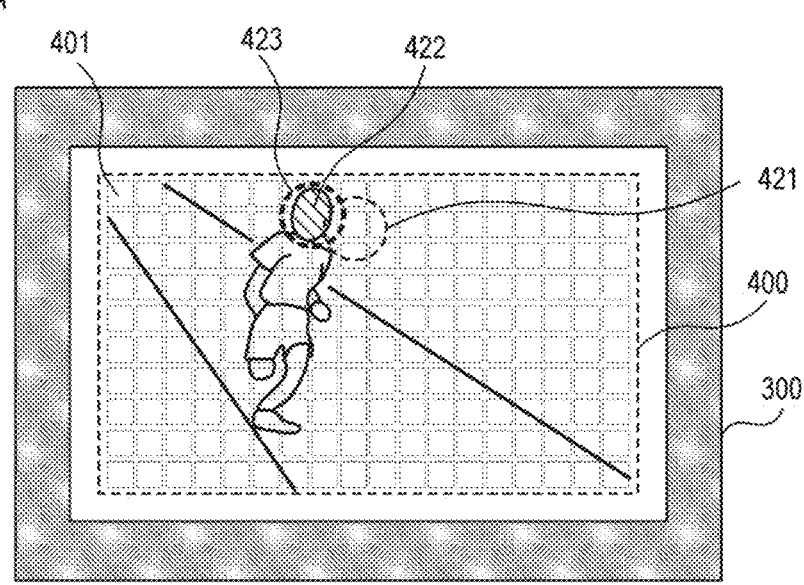
FIGS. 4A and 4B are diagrams showing display examples of the field of view in the viewfinder.

The automatic focus detection circuit 203 performs analog-to-digital conversion on the signal voltages received from multiple detection elements (multiple pixels), which are provided in the imaging element 2 to detect phase difference. The converted voltages are sent to the CPU 3. From the signals received from the detection elements, the CPU 3 calculates the distance to the object corresponding to the focus detection points. This is a conventional technique known as image-plane phase-detection AF. In this embodiment, as an example, it is assumed that there is a focus detection point at each of 180 locations on the imaging surface, which correspond to 180 locations in the viewfinder field of view (field of view when looking into the viewfinder) as shown in FIG. 4A, specifically the display surface of the display device 10.

The signal input circuit 204 is connected to a switch SW1 and a switch SW2. The switch SW1 is turned on by a first stroke (half-press) of the release button 5 to start photometry, focus detection (distance measurement), and the like of the camera 1. The switch SW2 is turned ON by a second stroke (full-press) of the release button 5 to start a shooting operation. ON signals from the switches SW1 and SW2 are input to the signal input circuit 204 and transmitted to the CPU 3. Photometry and focus detection are performed within a set photometry area or focus detection area, or within a selected (determined) main object area. For example, in photometry, the photometry circuit 202 may determine the brightness of the target area from the field brightness information. In focus detection, the automatic focus detection circuit 203 may determine the distance to the object in the target area.

The operation member 41 (touch panel), the operation member 42 (operation lever), and the operation member 43 (four-way key) send operation signals corresponding to operations received from the user to the CPU 3. The light-source drive circuit 205 drives the light sources 13a and 13b.

The image-processing unit 208 applies various types of image processing to the image captured by the imaging element 2. The image-processing unit 208 also obtains or generates various types of information from the captured image. The image-processing unit 208 may be formed by a dedicated hardware circuit, such as an application-specific integrated circuit (ASIC) designed to achieve specific functions. Also, the image-processing unit 208 may be formed by a processor, such as a digital signal processor (DSP) that achieves specific functions by executing software.

The image processing by the image-processing unit 208 includes pre-processing, color interpolation, correction, detection, data processing, evaluation value calculation, and the like. Pre-processing includes signal amplification, reference level adjustment, defective pixel correction, and the like. Color interpolation is processing for interpolating the values of color components not included in image data, and is al so called demosaicing. Correction includes white balance adjustment, image brightness correction, correction of the optical aberration of the photographic lens unit 1A, color calibration, and the like.

Detection includes detection and tracking of a characteristic area (e.g., area of face, human body, animal, and car), identification of a person, and the like. The image-processing unit 208 can identify the object to which the user is paying attention by detecting information on the user's line-of-sight position on the display surface of the display device 10, which displays an image, and detecting the object within the image. Also, the image-processing unit 208 can obtain motion characteristic information of the object, such as how the object in the image is moving in the image plane, by analyzing the differences between the images in time series.

Data processing includes scaling, encoding, decoding, header information generation, and the like. Evaluation value calculation includes calculation of evaluation values for pairs of signals for AF processing using phase-difference signals, contrast AF, automatic exposure control, and the like. The image processing performed by the image-processing unit 208 is not limited to the above example.

Figure 4B:
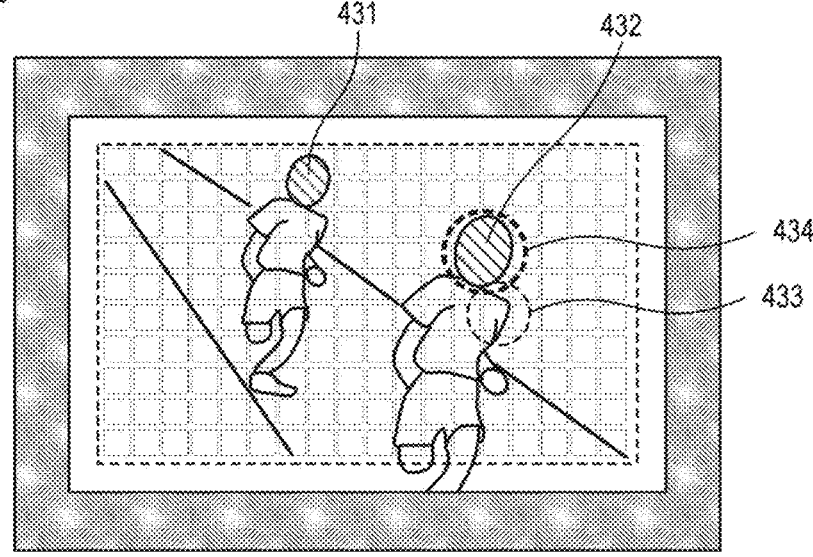

FIGS. 4A and 4B are diagrams showing display examples of the viewfinder field of view, and show a state in which the display device 10 is operating (a state in which an image is displayed). As shown in FIG. 4A, the viewfinder field of view includes a field of view mask 300, a focus detection area 400, 180 distance-measuring point indicators 401, and the like. The 180 distance-measuring point indicators 401 are displayed superimposed on the through image (live-view image) displayed on the display device 10 so as to be displayed at positions corresponding to the focus detection points on the imaging surface. The image-processing unit 208 can obtain information on the user's line-of-sight position on the display surface of the display device 10 from the eye image obtained by the eye imaging element 17 when the user looks into the viewfinder.

In FIG. 4A, a line-of-sight position 421 is a position where the user's line of sight is detected (an area including the line-of-sight position). An object 422 is a person detected through image analysis by the image-processing unit 208. In the following description, when the detection target is a person, the head area indicated by diagonal lines is detected as an object. Since human eyeballs have fixational eye movements, which are movements with fluctuations, the image-processing unit 208 preferably estimates that an object in the vicinity of the line-of-sight position is the object to which the user's line of sight is directed. When the line-of-sight position differs from the position at which an object is present, the image-processing unit 208 displays an icon 423 indicating the object to which the user's line of sight is directed. The displayed icon 423 allows the user to identify the object at which the user is estimated to be looking. Furthermore, the image-processing unit 208 can estimate the object at which the user is looking when the user directs his/her line of sight to the vicinity of the desired object.

The vicinity of the line-of-sight position may be a predetermined area that includes the line-of-sight position. For example, the predetermined area may be determined on the basis of the focal length, the shooting distance, or the shooting mode information in capturing the image, or the size of the object to which the line of sight is directed. The size of the object is the size within the image, and may be represented by the number of pixels occupied by the object, for example. Also, the predetermined area may be determined on the basis of the type of object, moving speed, and the like. When multiple objects are detected in the vicinity of the line-of-sight position, the image-processing unit 208 can estimate the object closer to the line-of-sight position as the object to which the user's line of sight is directed.

FIG. 4B shows an example in which multiple objects are present in an image. In the image shown in FIG. 4B, an object 431 and an object 432 are detected. The line-of-sight position 433 is the position at which the user's line of sight is detected. An icon 434 (corresponding to a first item) indicates the object that is estimated by the image-processing unit 208 as the target of the user's line of sight (hereinafter also referred to as an estimated object).

When the user moves his/her line of sight to the vicinity of the object 432, the image-processing unit 208 changes the estimated object from the object 431 to the object 432. The image-processing unit 208 displays the icon 434 indicating the estimated object on the object 432 to which the line of sight has been moved. The objects that may be detected in the image are not limited to people, and may be animals, vehicles, and the like.

Description of Line-of-Sight Detection Process

Figure 5:
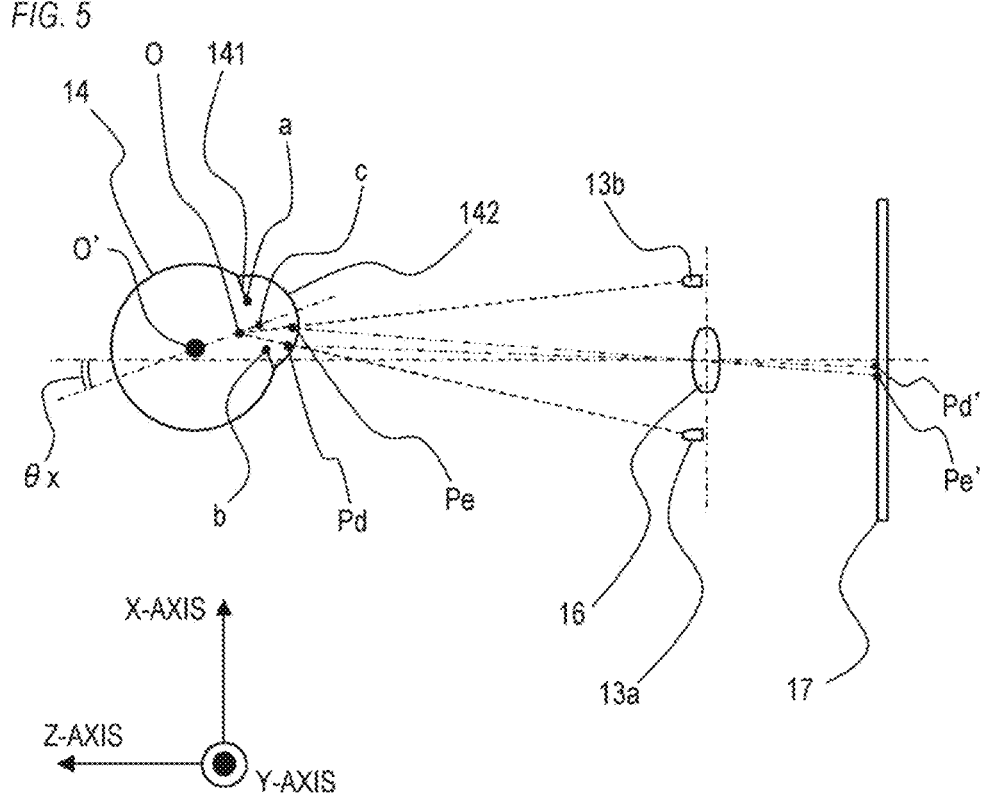
FIG. 5 is a diagram for illustrating the principle of a line-of-sight detection method.
Figure 6A:
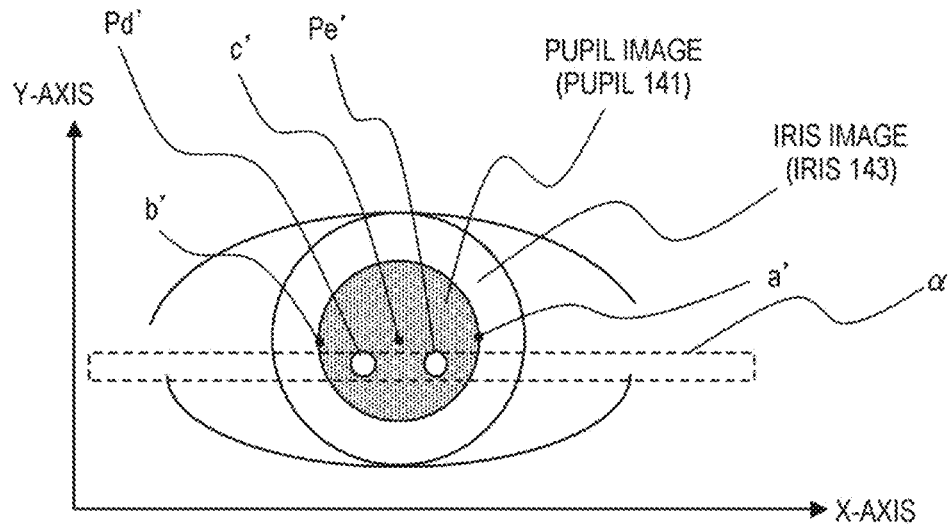
FIG. 6A is a diagram showing an eye image.
Figure 6B:
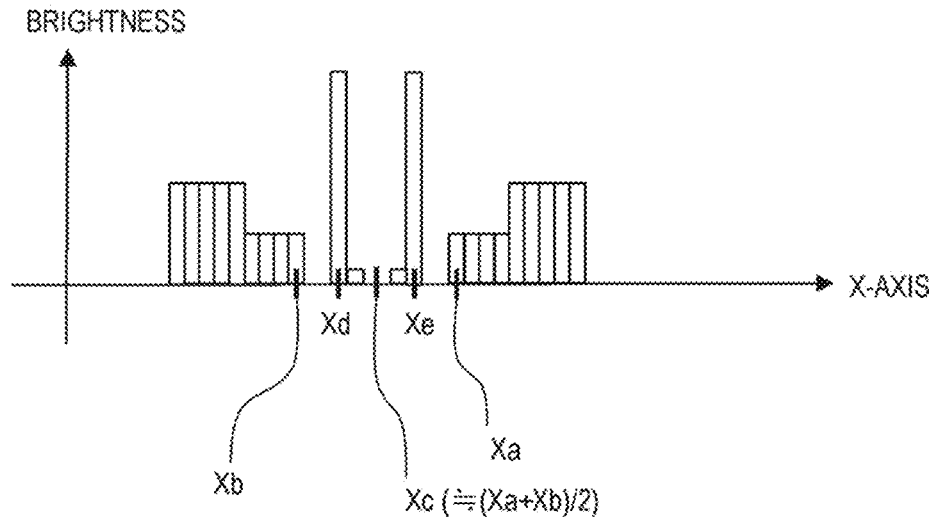
FIG. 6B is a diagram showing the brightness distribution of the eye image.
Figure 7:
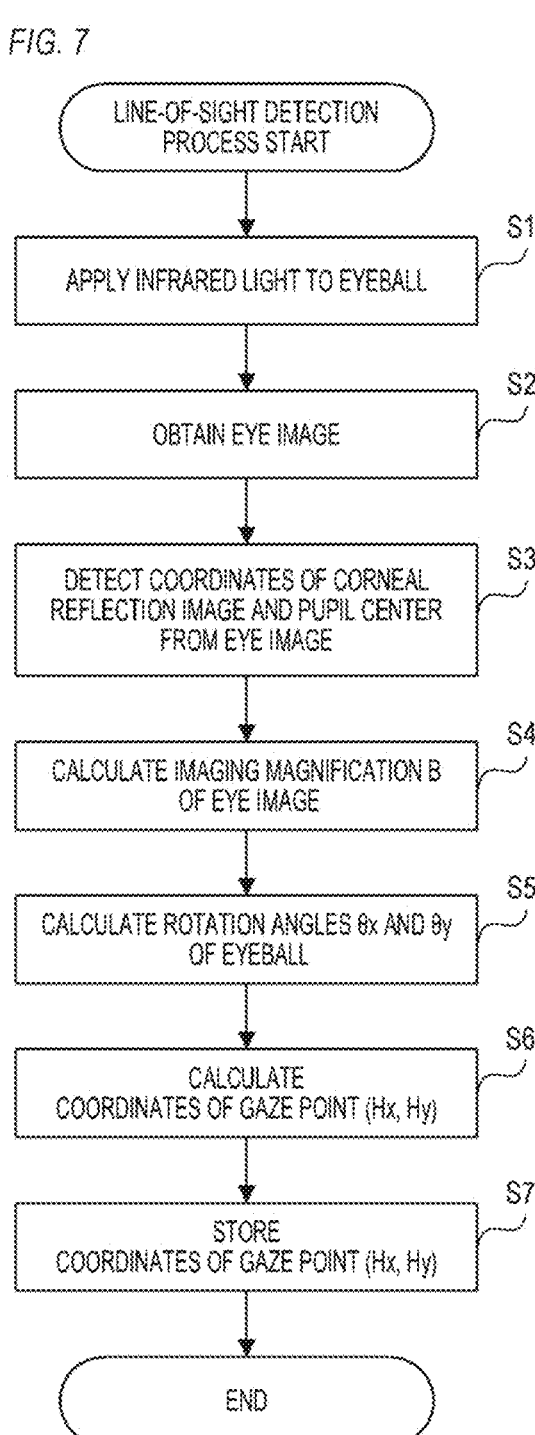
FIG. 7 is a flowchart of a line-of-sight detection process.

With reference to FIGS. 5, 6A, 6B, and 7, a line-of-sight detection process (line-of-sight detection method) for obtaining the line-of-sight position is described. Both the right eye's line of sight and the left eye's line of sight are detected using the following line-of-sight detection method. FIG. 5 is a schematic view of an optical system for line-of-sight detection, illustrating the principle of the line-of-sight detection method. As shown in FIG. 5, the light sources 13a and 13b are arranged substantially symmetrically with respect to the optical axis of the light-receiving lens 16 and illuminate an eyeball 14 of the user. Part of the light emitted from the light sources 13a and 13b and reflected on the eyeball 14 is focused on the eye imaging element 17 by the light-receiving lens 16. FIG. 6A is a schematic view of an eye image captured by the eye imaging element 17 (eye optical image projected onto the eye imaging element 17), and FIG. 6B is a diagram showing the output intensity of the eye imaging element 17. FIG. 7 is a flowchart of a line-of-sight detection process.

When the line-of-sight detection process in FIG. 7 starts, at step S1, the CPU 3 uses the light-source drive circuit 205 to drive the light sources 13a and 13b so as to emit infrared light toward the user's eyeball 14. An optical image of the user's eye illuminated by the infrared light passes through the light-receiving lens 16 and forms an image on the eye imaging element 17, which photoelectrically converts this image. A processable electric signal of the eye image is thus obtained.

At step S2, the CPU 3 obtains the eye image (image data, image signal) from the eye imaging element 17 via the line-of-sight detection circuit 201.

At step S3, the CPU 3 obtains the coordinates of the points corresponding to the corneal reflection images Pd and Pe of the light sources 13a and 13b and the center c of the pupil 141 from the eye image obtained at S2. The infrared light emitted from the light sources 13a and 13b illuminates the cornea 142 of the user's eyeball 14. At this time, the corneal reflection images Pd and Pe formed by part of the infrared light reflected on the surface of the cornea 142 are collected by the light-receiving lens 16 and form corneal reflection images Pd' and Pe' of the eye image on the eye imaging element 17. Similarly, the light beam from edge points a and b of the pupil 141 also forms pupil edge images a' and b' of the eye image on the eye imaging element 17.

FIG. 6B shows the brightness information (brightness distribution) of region a in the eye image of FIG. 6A. In FIG. 6B, the horizontal direction of the eye image is the X-axis direction, the vertical direction is the Y-axis direction, and the brightness distribution in the X-axis direction is shown. The coordinates in the X-axis direction (horizontal direction) of the corneal reflection images Pd' and Pe' are Xd and Xe, and the coordinates in the X-axis direction of the pupil edge images a' and b' are Xa and Xb.

As shown in FIG. 6B, extremely high levels of brightness are obtained at the X coordinates Xd and Xe of the corneal reflection images Pd' and Pe'. In the region from the coordinate Xa to the coordinate Xb, which corresponds to the region of the pupil 141 (the region of the pupil image formed by the light beam from the pupil 141 on the eye imaging element 17), the brightness levels are extremely low except for the coordinates Xd and Xe. In the region of the iris 143 outside the pupil 141 (the region of the iris image outside the pupil image formed by the light beam from the iris 143), brightnesses between the above two types of brightness is obtained. For example, in the region where the X coordinate (the coordinate in the X-axis direction) is greater than the X coordinate Xa and the region where the X coordinate is less than the X coordinate Xb, brightnesses between the above two types of brightness are obtained.

From the brightness distribution as shown in FIG. 6B, the X-coordinates Xd and Xe of the corneal reflection images Pd' and Pe' and the X-coordinates Xa and Xb of the pupil edge images a' and b' can be obtained. For example, the coordinates with extremely high brightness are obtained as the coordinates of the corneal reflection images Pd' and Pe', and the coordinates with extremely low brightness are obtained as the coordinates of the pupil edge images a' and b'. Furthermore, when the rotation angle θx of the optical axis of the eyeball 14 with respect to the optical axis of the light-receiving lens 16 is small, the X coordinate Xc of the pupil center image c' (center of the pupil image) that is formed on the eye imaging element 17 by the light beam from the pupil center c is expressed by Xc≈(Xa+Xb)/2. That is, the coordinate Xc of the pupil center image c' can be calculated from the X coordinates Xa and Xb of the pupil edge images a' and b'. The X-coordinates of the corneal reflection images Pd' and Pe' and the X-coordinates of the pupil center image c' are thus estimated.

At step S4, the CPU 3 calculates the imaging magnification β of the eye image. The imaging magnification β is a magnification determined by the position of the eyeball 14 with respect to the light-receiving lens 16, and can be calculated using a function of the interval (Xd–Xe) between the corneal reflection images Pd' and Pe'.

At step S5, the CPU 3 calculates the rotation angle of the optical axis of the eyeball 140 with respect to the optical axis of the light-receiving lens 16. The X coordinate of the midpoint between the corneal reflection images Pd and Pe is substantially equal to the X coordinate of the center of curvature O of the cornea 142. As such, when an average distance from the center of curvature O of the cornea 142 to the pupil center c is Oc, the rotation angle $θ_x$ of the eyeball 14 in the ZX plane (plane perpendicular to the Y-axis) is obtained by Expression 1 below. In addition, the rotation angle θy of the eyeball 140 in the ZY plane (plane perpendicular to the X-axis) can also be calculated by the same method as for the rotation angle θx.

$$β \times Oc \times SINθ_x \approx \{(Xd + Xe)/2\} - Xc \qquad \text{(Expression 1)}$$

At step S6, the CPU 3 uses the rotation angles Ox and Oy calculated at step S5 to estimate the user's line-of-sight position (hereinafter also referred to as gaze point) on the display device 10. Assuming that the coordinates of the gaze point (Hx, Hy) are the coordinates corresponding to the pupil center c, the coordinates of the gaze point (Hx, Hy) can be calculated by the following Expressions 2 and 3.

$$Hx = m \times (Ax \times θx + Bx) \qquad \text{(Expression 2)}$$

$$Hy = m \times (Ay \times θy + By) \qquad \text{(Expression 3)}$$

Parameter m in Expressions 2 and 3 is a constant determined by the configuration of the optical system for performing line-of-sight detection process, and a conversion coefficient that converts the rotation angles ex and Oy into coordinates corresponding to the pupil center c on the display device 10. Parameter m is determined in advance and stored in the memory unit 4. Line-of-sight correction parameters Ax, Bx, Ay, and By are line-of-sight correction parameters for correcting individual differences in line of sight. Line-of-sight correction parameters Ax, Bx, Ay, and By are obtained by calibrating the line-of-sight detection and are stored in the memory unit 4 in advance.

At step S7, the CPU 3 stores the coordinates of the gaze point and the time at which the eye image is obtained (hereinafter referred to as the line-of-sight detection time) in the memory unit 4, and ends the line-of-sight detection process.

The line-of-sight detection method is not limited to the above method, and may be any method that detects the line of sight on the basis of an eye image. Furthermore, an example has been described above in which the gaze point coordinates (Hx, Hy) are obtained as the result (final result) of line-of-sight detection, but any information may be obtained as the result of line-of-sight detection as long as it relates to the line of sight (line-of-sight information), such as rotation angles θx and θy.

Description of Icon Display Control Process

Figure 8A:
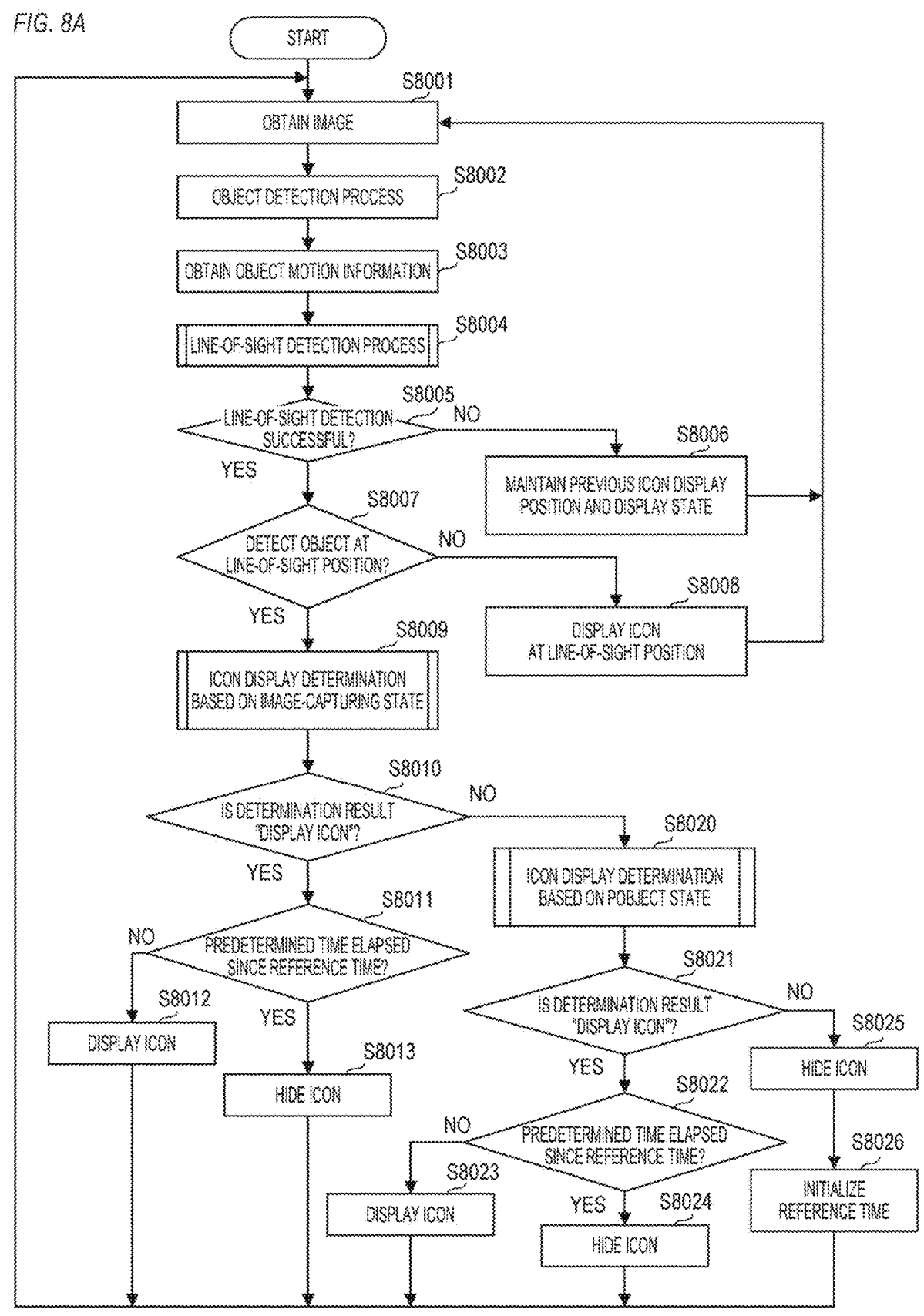
FIG. 8A is a flowchart illustrating icon display control process.

With reference to FIGS. 8A to 8C, control on display of an icon indicating the object to which the user's line of sight is directed is described. FIG. 8A is a flowchart illustrating an icon display control process of a first embodiment. The process shown in FIG. 8A includes image obtainment, object detection, and icon display control. The CPU 3 sequentially obtains images and repeatedly performs the process shown in FIG. 8A At step S8001, the CPU 3 obtains an image captured by the imaging element 2 and created by the image-processing unit 208 by applying various image processing. At step S8002, the CPU 3 detects an object in the image obtained at step S8001. Specifically, the CPU 3 obtains information on the position of a person's head detected from the image as object position information. For example, in the image of FIG. 9A, the CPU 3 detects an object 901 and obtains information on the position of the head of the object 901.

At step S8003, the CPU 3 obtains motion information (motion characteristic information, movement information) of the object in the image. The CPU 3 may obtain motion information of the object in the image by comparing the image obtained at step S8001 with images previously generated by the image-processing unit 208. For example, FIGS. 9A to 9C are images generated at time t1, time t2 after time t1, and time t3 after time t2, respectively. In this case, the CPU 3 may obtain motion information indicating that the object 901 is moving at approximately constant speed. As shown in FIG. 9D, when multiple objects including the object 901 are detected in the image and all exhibit similar motion characteristics, these objects are treated as an object group 902.

At step S8004, the CPU 3 uses the eye imaging element 17 and the line-of-sight detection circuit 201 to perform the line-of-sight detection process described in FIGS. 5 to 7, and obtains information on the line-of-sight position. At step S8005, the CPU 3 determines whether the line-of-sight detection (obtaining information on the line-of-sight position) is successful at step S8004. If the line-of-sight detection is successful, the process proceeds to step S8007. If line-of-sight detection fails, the process proceeds to step S8006.

At step S8006, the CPU 3 maintains the display position of the icon (first item) and the display state regarding whether to display the icon in the previous process (process for the image captured before the current image), and returns to S8001. Specifically, if the icon was not displayed in the previous process, the CPU 3 does not display an icon for the current image, and if the icon was displayed in the previous process, the CPU 3 controls to display the icon in the current image at the same position as in the previous image.

When the line-of-sight detection fails, the CPU 3 may display an icon in a manner different from when the line-of-sight detection is successful, in order to notify the user that the line-of-sight detection has failed. For example, when line-of-sight detection fails, the CPU 3 may display an icon in a color different from that when line-of-sight detection is successful, or blink the icon. To avoid visibility being reduced by frequent color changes, the CPU 3 may change the icon display manner after a predetermined time has elapsed since a failure of line-of-sight detection is determined.

At step S8007, the CPU 3 determines whether an object is detected at the line-of-sight position obtained at step S8004. If the object detected at step S8002 is present in the vicinity of the user's line-of-sight position, the CPU 3 may determine that the object is detected at the user's line-of-sight position. If an object is detected at the line-of-sight position, the process proceeds to step S8009. If an object is not detected at the line-of-sight position, the process proceeds to step S8008.

Figure 10:
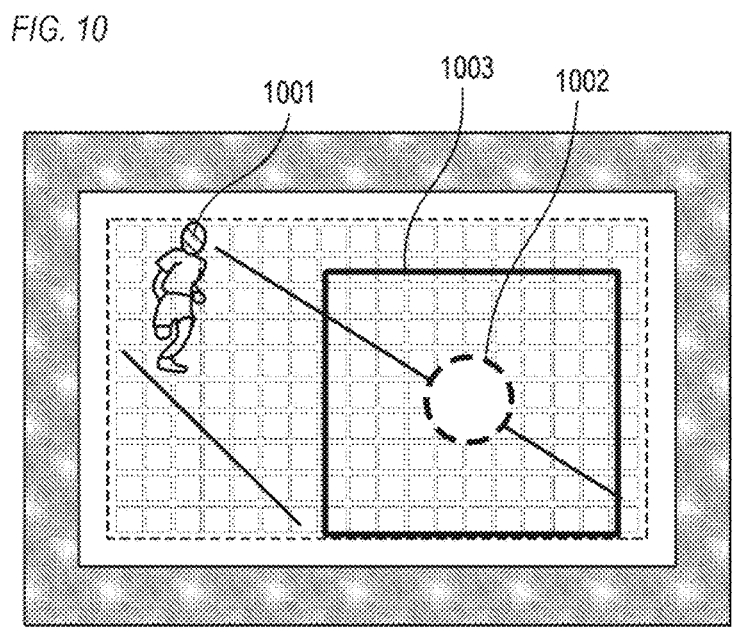
FIG. 10 is a diagram illustrating an icon indicating a line-of-sight position.

At step S8008, the CPU 3 displays an icon at the line-of-sight position obtained at step S8004. For example, in FIG. 10, since the user's line-of-sight position is away from the object 1001 in the image, the CPU 3 displays an icon 1002 (second item) indicating the detected user's line-of-sight position. For example, when the object 1001 in the image is away from the user's line-of-sight position by a predetermined distance or more, the CPU 3 displays an icon indicating the user's line-of-sight position.

When displaying the icon 1002 indicating the line-of-sight position, the CPU 3 does not display an icon indicating the object to which the user's line of sight is directed (first item), since there is no object at the user's line-of-sight position. This allows the CPU 3 to notify the user that the object 1001 is not identified as the object to which the user's line of sight is directed.

An area 1003 represents the vicinity of the user's line-of-sight position. The CPU 3 sets the area 1003 as an area for determining whether an object is present in the vicinity of the line-of-sight position. The area 1003 may be set by the user using the operation members 41 to 43. Also, the CPU 3 may automatically set the area 1003 according to the optical state of the lens, such as the focal length of the photographic lens unit 1A or the photographing object distance at the focus position. Furthermore, the CPU 3 may automatically set the area 1003 according to the mode setting of the AF function set in the camera 1, for example. That is, the vicinity of the line-of-sight position is an area that includes the user's line-of-sight position and can be set by the user or the CPU 3.

At step S8009, the CPU 3 determines, on the basis of the state of image capturing with the camera 1 performed by the user, whether to display an icon indicating the object to which the user's line of sight is directed. Examples of the state of image capturing with the camera 1 include whether the user is paying attention to the object estimated by the image-processing unit 208, whether the imaging area of the image has changed, and whether the orientation of the image-capturing device capturing the image has changed.

Referring to FIG. 8B, details of the process at step S8009 are described. At step S8201, the CPU 3 determines whether the user, who is the photographer, is paying attention to the object the user wants to capture (the object to which the line of sight is estimated to be directed, the estimated object).

To determine whether the user is paying attention to the estimated object, the CPU 3 refers to the degree of stability of the user's line-of-sight position, the presence or absence or frequency of the user's blinking, and the like from the eye image captured by the eye imaging element 17. For example, the CPU 3 determines that the user is paying attention to the estimated object if the amount of movement of the user's line-of-sight position in a predetermined time is less than a first threshold, or if the number of blinks in a predetermined time is less than a second threshold. Since there are individual differences in the degree of stability of the line-of-sight position and the frequency of blinking, the first and second thresholds may be set in advance for each user. If the user is paying attention to the estimated object, the process proceeds to step S8202. If the user is not paying attention to the estimated object, the process proceeds to step S8203.

At step S8202, the CPU 3 determines to display an icon indicating the estimated object. By displaying an icon indicating the estimated object, the CPU 3 can notify the user that the object to which the user is paying attention is identified as the photographing target. For example, when the user is waiting in anticipation for the object that he or she wants to capture to move to the desired position during a dolphin show, for example, or when the user is aiming for a photo opportunity in front of a soccer goal, displaying an icon indicating the object to which the user is paying attention allow the user to capture a photo opportunity.

At step S8203, the CPU 3 determines whether a zoom operation, a pan operation, or a tilt operation has been performed. The zoom operation includes a user's zoom operation on the photographic lens unit 1A and a digital zoom operation on the camera 1. By determining whether a zoom operation, pan operation, or tilt operation has been performed, the CPU 3 determines whether the imaging area of the image has changed.

For example, when a zoom operation is performed, the amount of change in focal length caused by the zoom operation is greater than a third threshold, or the amount of change in zoom magnification caused by the zoom operation is greater than a fourth threshold, the CPU 3 may determine that the imaging area of the image has changed. When a pan operation or a tilt operation is performed, or the amount of movement of the imaging area caused by the pan operation or the tilt operation is greater than a fifth threshold, the CPU 3 may determine that the imaging area of the image has changed. The third to fifth thresholds may be determined on the basis of whether there is a possibility that the change of the imaging area causes the user to lose sight of the object to which his/her line of sight is directed. If there is a zoom operation, pan operation, or tilt operation, the process proceeds to step S8202. If there is no zoom operation, pan operation, or tilt operation, the process proceeds to step S8204.

At step S8202, the CPU 3 determines to "display icon" indicating the estimated object. When the composition changes due to a zoom operation, for example, the position of the object to which the user's line of sight is directed may change. If a different object appears at the position of the object to which the line of sight is originally directed, the user may lose sight of the object the user is trying to capture. For this reason, when the imaging area of the image changes due to a zoom operation or the like, the CPU 3 displays an icon indicating the estimated object so that the user does not lose sight of the object the user is trying to capture.

Figure 11A:
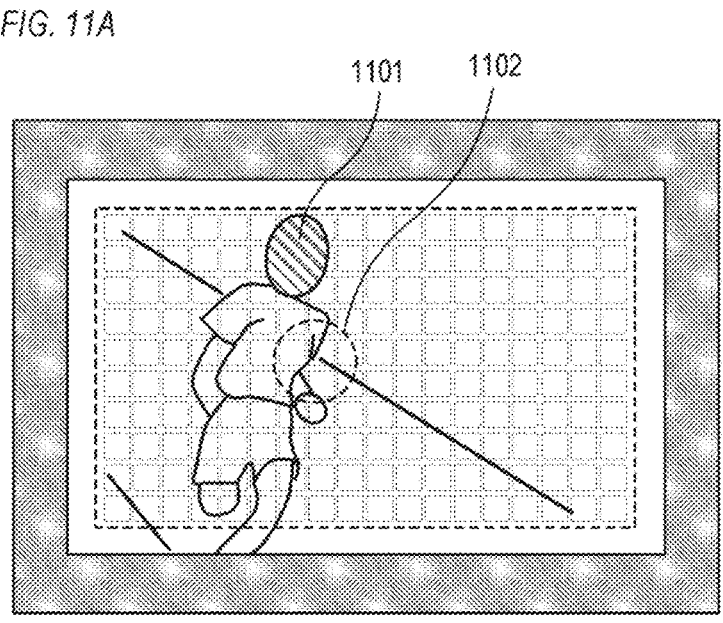
FIGS. 11A and 11B are diagrams illustrating icon display based on a zoom operation.
Figure 11B:
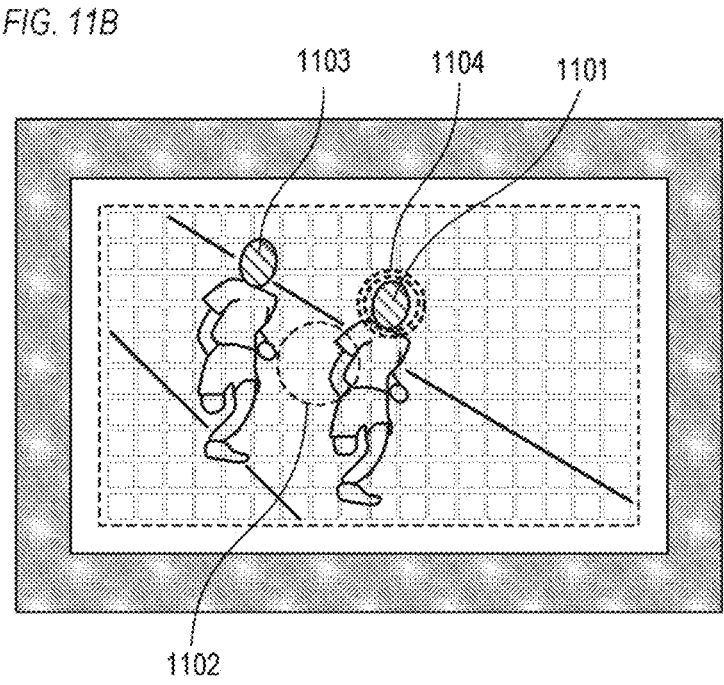

FIGS. 11A and 11B are diagrams illustrating icon display based on a zoom operation. FIG. 11A shows a state in which the image is zoomed in to the telephoto end and an object 1101 is estimated to be the object to which the user's line of sight is directed. Since there is only one object in the vicinity of the line-of-sight position 1102 (the icon indicating the line-of-sight position 1102 is hidden on the display device 10), the icon indicating the object to which the user's line of sight is directed is hidden.

FIG. 11B shows a state after a zoom operation toward the wide end is performed from the state of FIG. 11A. In FIG. 11B, an object 1103 different from the object 1101 is detected in the image. If the line-of-sight position 1102 is at the same position as before the zoom operation, the user may be confused and concerned about the possibility that the object 1103 is identified as the estimated object. For this reason, when the user directs his/her line of sight to the object 1101, the CPU 3 determines that an icon should be displayed on the object 1101 to notify the user that the object 1101 is identified as the estimated object.

At step S8204, the CPU 3 determines whether the orientation of the camera 1 has changed. When capturing images with the camera 1, the user selectively uses a horizontal position, which captures an image with the long side in the horizontal direction, or a vertical position, which captures an image with the long side in the vertical direction. The CPU 3 determines whether the orientation of the camera 1 has changed by switching from the horizontal position to the vertical position, for example. The CPU 3 can obtain information on the orientation of the camera 1 through the orientation-detecting unit 207.

The CPU 3 may determine whether the orientation of the camera 1 has changed while the information on the user's line-of-sight position is obtained. When changing the orientation of the camera 1 while looking into the viewfinder, the user can easily identify the desired object with an icon displayed to indicate the estimated object. If the orientation of the camera 1 has changed, the process proceeds to step S8202. If the orientation of the camera 1 has not changed, the process proceeds to step S8205.

At step S8202, the CPU 3 determines to display an icon indicating the estimated object. This is to keep the user from losing sight of the object the user was looking at before the change of orientation of the camera 1, since a change of orientation of the camera 1 tends to make the user's line-of-sight position unstable.

Figure 12A:
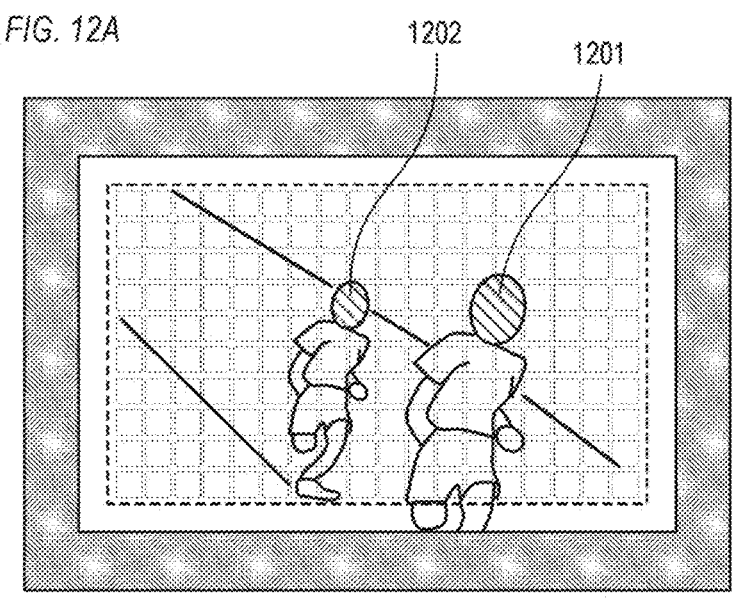
FIGS. 12A and 12B are diagrams illustrating icon display based on a change in camera orientation.
Figure 12B:
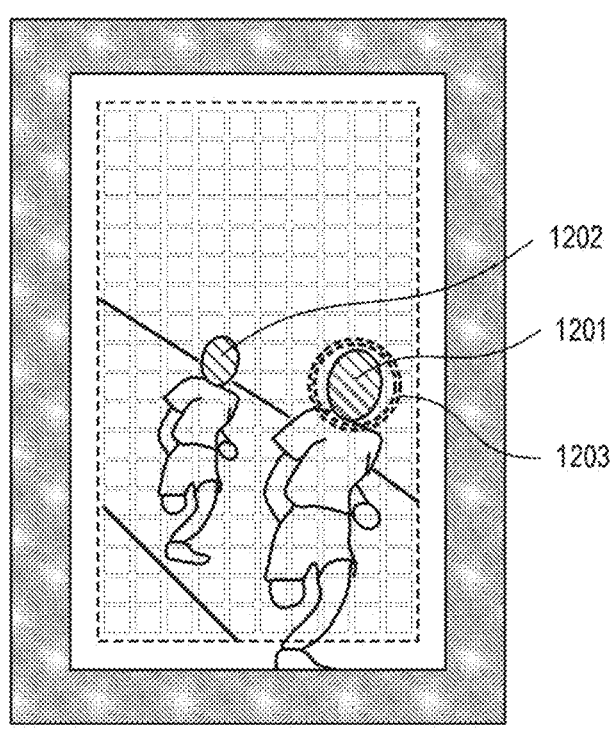

FIGS. 12A and 12B are diagrams illustrating icon display based on a change of orientation of the camera 1. FIG. 12A shows an example of an image captured in the horizontal position. In FIG. 12A, an object 1201 and an object 1202 are detected. The user's line of sight is directed to the object 1201. FIG. 12B shows an example of an image after the user changes the position of the camera 1 to the vertical position from the state shown in FIG. 12A. While changing the position of the camera 1 from horizontal to vertical, the user's line-of-sight position is unstable due to the change in composition. To prevent the user from erroneously identifying the object 1202 as the object 1201 that has been looked at, the CPU 3 determines to display an icon 1203 indicating the estimated object.

At step S8205, the CPU 3 determines that whether to display an icon indicating the estimated object is undecided ("icon display is undecided"). That is, if none of the conditions at step S8201, step S8203, and step S8204 is satisfied, the CPU 3 determines whether to display an icon indicating the estimated object at step S8020 in FIG. 8A, which will be described below, on the basis of the state of the object.

At step S8206, the CPU 3 determines whether the icon indicating the estimated object is currently displayed or hidden. If the icon indicating the estimated object is hidden, the process proceeds to step S8207. If the icon indicating the estimated object is displayed, the process shown in FIG. 8B ends.

At step S8207, the CPU 3 records the current time in the memory unit 4 as a reference time. Step S8207 is performed when the icon indicating the estimated object is currently hidden and it is determined at step S8202 that the icon is to be displayed. By recording the time (reference time) at which the transition from the hidden state to the displayed state of the icon is determined, the CPU 3 can measure the time that has elapsed since the icon transitions to the displayed state.

As described above, through the process shown in FIG. 8B, the CPU 3 determines whether to display the icon of the object to which the user's line of sight is directed, on the basis of the image-capturing state (the state on the photographer's side). The CPU 3 ends the process in FIG. 8B and proceeds to step S8010 in FIG. 8A.

At step S8010 of FIG. 8A, the CPU 3 determines whether the result of determination on whether to display the icon indicating the estimated object at step S8009 is "display icon". If the determination result is "display icon", the process proceeds to step S8011. If the determination result is "icon display is undecided", the process proceeds to step S8020.

At step S8011, the CPU 3 determines whether a predetermined time has elapsed since the reference time recorded at step S8207 in FIG. 8B. That is, the CPU 3 determines whether the predetermined time has elapsed since the time (reference time) at which the icon indicating the estimated object transitioned from the hidden state to the displayed state. If the predetermined time has elapsed since the reference time, the process proceeds to step S8013. If the predetermined time has not elapsed since the reference time, the process proceeds to step S8012.

At step S8012, the CPU 3 displays the icon indicating the estimated object (e.g., icon 423 in FIG. 4A). At step S8013, the CPU 3 hides the icon indicating the estimated object. After a predetermined time has elapsed since the icon indicating the estimated object is displayed in response to a change in the image-capturing state, it is assumed that the user's line of sight is stably directed to the desired object. For this reason, the CPU 3 hides the icon indicating the estimated object.

An example has been described above in which the icon indicating the estimated object is automatically hidden after a predetermined time has elapsed since the icon is switched to the displayed state from the hidden state. However, the CPU 3 may maintain the displayed state of the icon. Also, the predetermined time from the reference time for hiding the icon indicating the estimated object may be set by the user. At step S8012 and step S8013, when the icon indicating the estimated object is displayed or hidden, respectively, the process returns to step S8001.

At step 8020, the CPU 3 determines whether to display the icon indicating the object to which the user's line of sight is directed, on the basis of the state of the object. Examples of the state of the object include whether the number of objects in the image has changed, whether the number of objects in the image is two or more, whether the estimated object is accelerating or decelerating, and whether the estimated object is in focus.

Referring to FIG. 8C, details of the process at step S8020 are described. At step S8301, the CPU 3 determines whether there is an increase or decrease in the number of objects in the image from the previous image (frame). The number of objects is not limited to the number of objects in the image, and may be the number of objects detected in the vicinity of the line-of-sight position. Specifically, the number of objects may be the number of objects detected in a predetermined area including the estimated object to which the line of sight is directed. The predetermined area may be determined on the basis of at least one of the focal length, the shooting distance, or the shooting mode information in capturing the image, or the size of the estimated object. The objects to be detected are objects that can be detected by image analysis, such as people, animals, and cars.

The CPU 3 may detect a predetermined type of object among the objects in the image. For example, when the user sets animal as the predetermined type, the CPU 3 detects animals as objects. The user may set multiple types of objects as the predetermined types. If there is an increase or decrease in the number of detected objects, the process proceeds to S8302. If there is no increase or decrease in the number of detected objects, the process proceeds to S8303.

At step S8302, the CPU 3 determines to display the icon indicating the estimated object. Displaying the icon indicating the estimated object allows the user to easily identify the object he or she is looking at even when the number of objects increases or decreases.

At step S8303, the CPU 3 determines whether the number of objects detected in the vicinity of the line-of-sight position is one. If the number of objects is one, the process proceeds to step S8304. If there are multiple objects, the process proceeds to step S8307.

At step S8304, the CPU 3 determines whether the one object in the vicinity of the line-of-sight position on the screen is in focus. If the object is in focus, the process proceeds to step S8305. If the object is not in focus, the process proceeds to step S8306.

At step S8305, the CPU 3 determines to "hide icon". At step S8306, the CPU 3 determines to "display icon". The CPU 3 can notify the user that the object the user is looking at is not in focus by displaying an icon when the object is out of focus.

FIGS. 13A and 13B are diagrams illustrating icon display based on a change in the number of objects described in the process from steps S8301 to S8306. FIG. 13A shows a state in which an object 1301 is present in the vicinity of the line-of-sight position 1302 at time t11. Since it is clear that the object to which the user's line of sight is directed is the object 1301, the icon indicating the estimated object and the icon indicating the line-of-sight position 1302 are hidden.

FIG. 13B shows a state in which a different object 1303 appears in the composition after the state in FIG. 13A. Since the object 1303 appears in the vicinity of the line-of-sight position 1304, the CPU 3 preferably notifies the user whether his/her line of sight is directed to the object 1301 or the object 1303. As such, the CPU 3 displays an icon 1305 indicating the object to which the user's line of sight is directed. The icon indicating the line-of-sight position 1304 is hidden.

At step S8307, the CPU 3 determines whether the objects in the vicinity of the user's line-of-sight position are stationary or moving at a constant speed. Step S8307 is performed when there are multiple objects in the vicinity of the line-of-sight position. The CPU 3 obtains information on the motion characteristics (motion information) of the objects in the vicinity of the line-of-sight position. The motion information can be obtained in the same manner as the method of step S8003 in FIG. 8A described with reference to FIGS. 9A to 9C. Depending on the motion characteristics (movement) of the objects, the icon indicating the object to which the user's line of sight is directed is preferably displayed so that the user does not lose sight of the desired object.

If the CPU 3 determines on the basis of the motion information that the objects in the vicinity of the line-of-sight position are stationary or moving at a constant speed, the CPU 3 proceeds to step S8308. If the CPU 3 determines that any of the objects in the vicinity of the line-of-sight position is moving while accelerating or decelerating, the process proceeds to step S8310.

At step S8308, the CPU 3 determines whether the object to which the user's line of sight is directed is in focus. If the object to which the user's line of sight is directed is in focus, the process proceeds to step S8309. If the object to which the user's line of sight is directed is out of focus, the process proceeds to step S8310.

At step S8309, the CPU 3 determines to "hide icon". When the object is in focus, it is assumed that the user's line of sight is stably directed to the desired object. Thus, the process determines to hide the icon indicating the estimated object.

At step S8310, the CPU 3 determines to "display icon". If the object is out of focus, it is assumed that the user is not stable. Thus, the process determines to display the icon indicating the estimated object. Additionally, when an object in the vicinity of the line-of-sight position is moving while accelerating or decelerating (for example, when performing intense movements such as dancing), the CPU 3 determines to display the icon indicating the object to which the user's line of sight is directed. When the icon indicating the object to which the user's line of sight is directed is displayed, the user is less likely to lose sight of the desired object.

FIGS. 14A to 14D are diagrams illustrating icon display based on the object motion information described with steps S8307 to S8310. FIG. 14A is an example of what is known as portrait photography, and multiple objects are in a stationary state. An object 1401 detected from the image is out of focus. The CPU 3 estimates that the user's line of sight is directed to the object 1401 located in the vicinity of the line-of-sight position 1402, and displays an icon 1403 indicating that the object 1401 is the estimated object.

FIG. 14B shows a state in which the object 1401 is in focus. The CPU 3 displays an icon 1404 indicating that the object 1401 is in focus, and hides the icon 1403 indicating the estimated object. By preferentially displaying the icon 1404 indicating the object is in focus, the CPU 3 can limit the amount of information to be displayed to assure visibility. Also, the CPU 3 can timely notify the user that the object 1401 is in focus.

FIG. 14C shows a state in which an object group 1414 including an object 1411 in the vicinity of the line-of-sight position and multiple nearby objects has similar motion characteristics. FIG. 14C shows the state at time t21. The CPU 3 displays, on the object 1411 in the vicinity of the line-of-sight position 1412, an icon 1413 indicating the estimated object.

FIG. 14D shows a state in which, after the state shown in FIG. 14C, the object group 1414 including the object 1411 and the multiple nearby objects is moving in the same direction at approximately constant speed. FIG. 14D shows the state at time t22. At this time, an object 1415 different from the object 1411 is present in the vicinity of the line-of-sight position 1412. As such, the object 1415 is estimated to be the object to which the user's line of sight is directed.

In FIG. 14D, the object 1415 is assumed to be in focus. At time t22, the object 1411 and the object 1415 in the object group 1414 are moving with similar motion characteristics. The CPU 3 displays an icon 1416 on the object 1415 indicating that the object is in focus, but does not display the icon indicating the estimated object. The CPU 3 preferentially displays the icon 1416 and does not display the icon indicating that the object 1415 is the estimated object, thereby limiting the amount of displayed information to assure visibility. Also, the CPU 3 can timely notify the user that the object 1415 is in focus.

At step S8312, the CPU 3 determines whether it has been determined in the process from steps S8301 to S8310 to "display icon" or to "hide icon". If it has been determined to "display icon", the process proceeds to step S8313. If it has been determined to "hide icon", the process shown in FIG. 8C ends.

At step S8313, the CPU 3 determines whether the icon indicating the estimated object is currently displayed or hidden. If the icon indicating the estimated object is currently hidden, the process proceeds to step S8314. If the icon indicating the estimated object is currently displayed, the process shown in FIG. 8C ends.

At step S8314, the CPU 3 records the current time in the memory unit 4 as a reference time. Step S8314 is performed when the icon indicating the estimated object is currently hidden and it is determined to "display icon". By recording the time (reference time) at which the switching from the hidden state to the displayed state of the icon is determined, the CPU 3 can measure the time that has elapsed since the icon transitions to the displayed state.

As described above, through the process shown in FIG. 8C, the CPU 3 determines whether to display the icon of the object to which the user's line of sight is directed, on the basis of the state of the object. The CPU 3 ends the process in FIG. 8C and proceeds to step S8021 in FIG. 8A.

At step S8021 of FIG. 8A, the CPU 3 determines whether the result of determination on whether to display the icon indicating the estimated object at step S8020 is "display icon". If the determination result is "display icon", the process proceeds to step S8022. If the determination result is "hide icon", the process proceeds to step S8025.

At step S8022, the CPU 3 determines whether a predetermined time has elapsed since the reference time recorded at step S8314 in FIG. 8C. That is, the CPU 3 determines whether the predetermined time has elapsed since the time (reference time) at which the icon indicating the estimated object transitioned from the hidden state to the displayed state. If the predetermined time has elapsed since the reference time, the process proceeds to step S8024. If the predetermined time has not elapsed since the reference time, the process proceeds to step S8023.

At step S8023, the CPU 3 displays the icon indicating the object to which the user's line of sight is directed (estimated object). At step S8024, the CPU 3 hides the icon indicating the estimated object. At step S8023 and step S8024, when the icon indicating the estimated object is displayed or hidden, respectively, the process returns to step S8001.

At step S8025, the CPU 3 hides the icon indicating the object to which the user's line of sight is directed (estimated object), in accordance with the determination result at step S8020. At step S8026, the CPU 3 initializes the reference time recorded at step S8207 or step S8314, and returns to step S8001.

According to the first embodiment, on the basis of at least one of the image-capturing state of the image and the state of the object in the mage, the camera 1 controls whether to display an icon that indicates the object to which the user's line of sight is estimated to be directed (estimated object). By automatically displaying or hiding an icon indicating the estimated object, the camera 1 can achieve both the assurance of visibility and enhanced operability in accordance with the state.

The icon display control process described with reference to FIG. 8A is an example of a process in which icon display determination based on the image-capturing state (FIG. 8B) is followed by icon display determination based on the object state (FIG. 8C). However, the order of determination is not limited to this. The CPU 3 may determine whether to display an icon indicating the estimated object by determining at least one of the various conditions described as the image-capturing states and the various conditions described as the object states in any order.

Second Embodiment

In the first embodiment, the camera 1 determines whether the object in the vicinity of the line-of-sight position is in focus, and if it is in focus, controls to hide the icon indicating the object to which the user's line of sight is directed (estimated object). On the other hand, common photography techniques include changing the composition after focusing on a specific object (focus lock), and changing the line-of-sight position in search for another object while maintaining the focus position. The second embodiment displays an icon indicating the estimated object in a situation where the user changes the composition or the line-of-sight position after an object is in focus. By continuing to display an icon indicating the estimated object even after the object is in focus, operability relating to focus lock, search for another object, and the like is improved.

Figure 15:
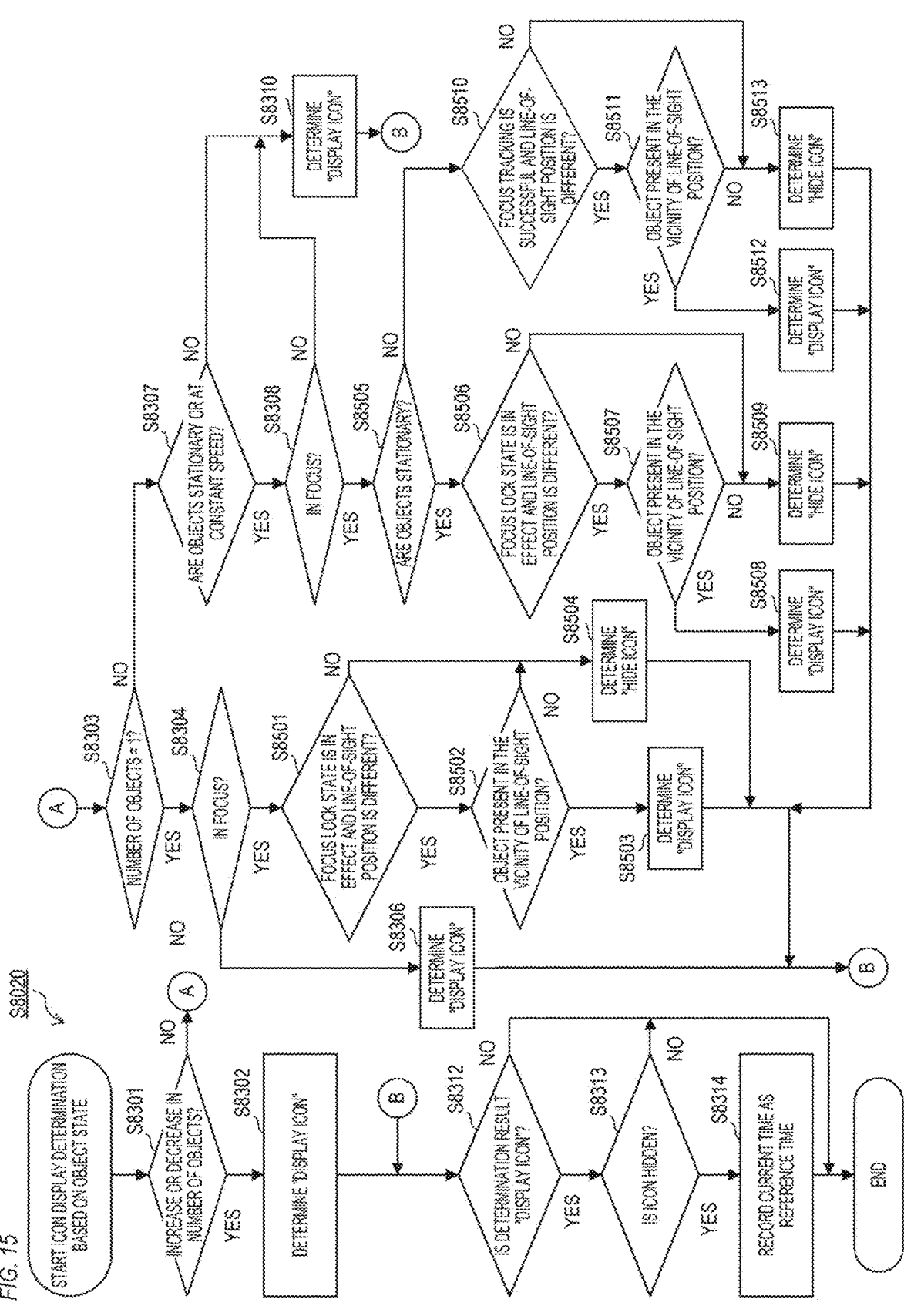
FIG. 15 is a flowchart of an icon display determination process according to a second embodiment.

FIG. 15 is a flowchart of an icon display determination process according to the second embodiment. The process of FIG. 15 is a process in which steps S8501 to S8504 and steps S8505 to S8513 are added to the icon display determination process based on the object state in FIG. 8C. The same reference numerals are given to the steps that are the same as in FIG. 8C. Such steps will not be described in detail.

If it is determined at step S8304 that the one object in the vicinity of the line-of-sight position on the screen is in focus, the process proceeds to step S8501. At step S8501, one object is in the vicinity of the line-of-sight position on the screen, and this object is in focus. At step S8501, the CPU 3 determines whether focus lock is in effect to fix the focus position to the object in focus and whether the line-of-sight position is at a position different from the object of focus lock target (object in focus).

Whether the line-of-sight position is at a position different from the object of focus lock target may be determined by determining whether the distance between the object of focus lock target (object in focus) and the line-of-sight position is greater than or equal to a predetermined threshold. When the distance between the object of focus lock target and the line-of-sight position is greater than or equal to the predetermined threshold, the CPU 3 determines that the line-of-sight position is at a position different from the object of focus lock target. The predetermined threshold may be dynamically changed on the basis of the shooting mode of the camera 1, the state of the lens such as the focal length, and the like.

If the line-of-sight position is at a position different from the object of focus lock target, the process proceeds to step S8502. If the line-of-sight position is not at a position different from the object of focus lock target, the process proceeds to step S8504.

At step S8502, the CPU 3 determines whether an object different from the object of focus lock target is present in the vicinity of the line-of-sight position. If an object is present in the vicinity of the line-of-sight position, the process proceeds to step S8503. If there is no object in the vicinity of the line-of-sight position, the process proceeds to step S8504.

At step S8503, the CPU 3 determines to "display icon". At step S8504, the CPU 3 determines to "hide icon". When the user is looking at an object different from the object of focus lock target, the CPU 3 can notify the user of the estimated object by displaying an icon indicating the object to which the user's line of sight is directed.

If it is determined at step S8308 that the object to which the user's line of sight is directed is in focus, the process proceeds to step S8505. At step S8505, multiple objects are present in the vicinity of the line-of-sight position. The multiple objects, which are stationary or moving at constant speed, are in focus. At step S8505, the CPU 3 determines whether the objects in focus are stationary or moving at a constant speed. If the objects in focus are stationary, the process proceeds to step S8506. If the objects in focus are moving at a constant speed, the process proceeds to step S8510.

At step S8506, the CPU 3 determines whether focus lock is in effect to fix the focus position to the object in focus and whether the line-of-sight position is at a position different from the object of focus lock target (object in focus). If the line-of-sight position is at a position different from the object of focus lock target, the process proceeds to step S8507. If the line-of-sight position is at the position of the object of focus lock target, the process proceeds to step S8509.

At step S8507, the CPU 3 determines whether there is an object different from the object of focus lock target in the vicinity of the line-of-sight position. If an object is present in the vicinity of the line-of-sight position, the process proceeds to step S8508. If there is no object in the vicinity of the line-of-sight position, the process proceeds to step S8509.

At step S8508, the CPU 3 determines to "display icon". At step S8509, the CPU 3 determines to "hide icon". When the user is looking at an object different from the object of focus lock target, the CPU 3 can notify the user of the object to which the user's line of sight is directed, by displaying an icon indicating the estimated object.

Figure 16B:
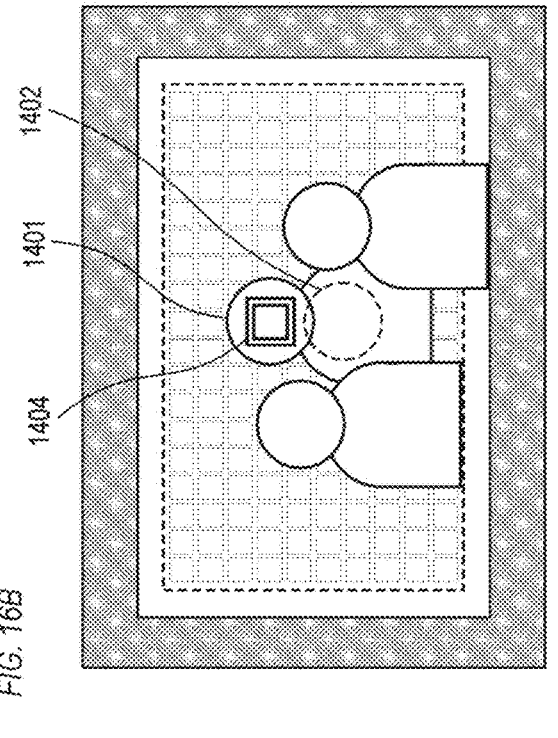
FIGS. 16A to 16D are diagrams illustrating icon display in a focus lock state.
Figure 16D:
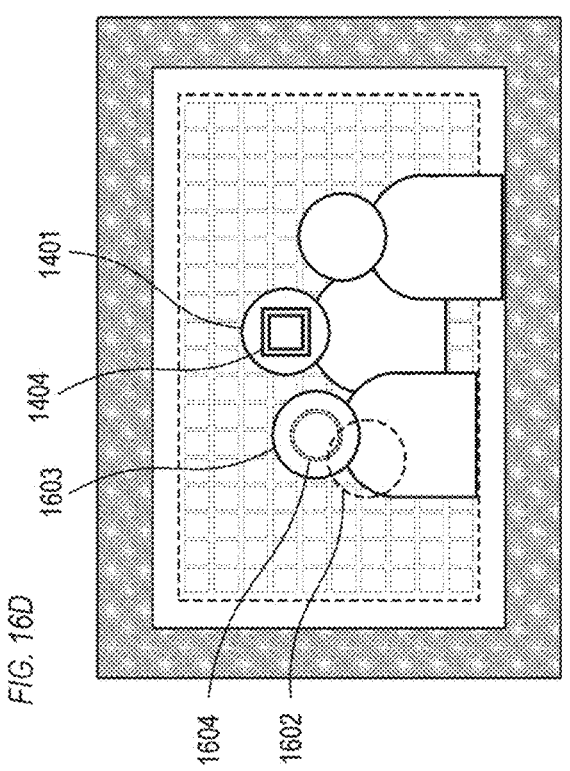
Figure 16A:
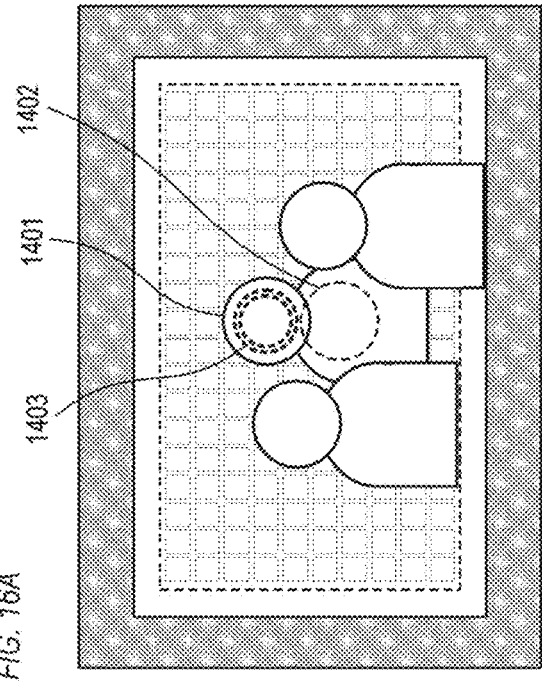

FIGS. 16A to 16D are diagrams illustrating icon display in a focus lock state. The object 1401, line-of-sight position 1402, icon 1403, and icon 1404 in FIGS. 16A and 16B are the same as those in FIGS. 14A and 14B of the first embodiment. In FIG. 16A, the object 1401 is present in the vicinity of the line-of-sight position 1402. In FIG. 16B, the object 1401 is in focus, and icon 1404 indicating that the object is in focus is displayed. In contrast, the icon 1403 indicating the estimated object is hidden. The CPU 3 also locks the focus on the object 1401.

Figure 16C:
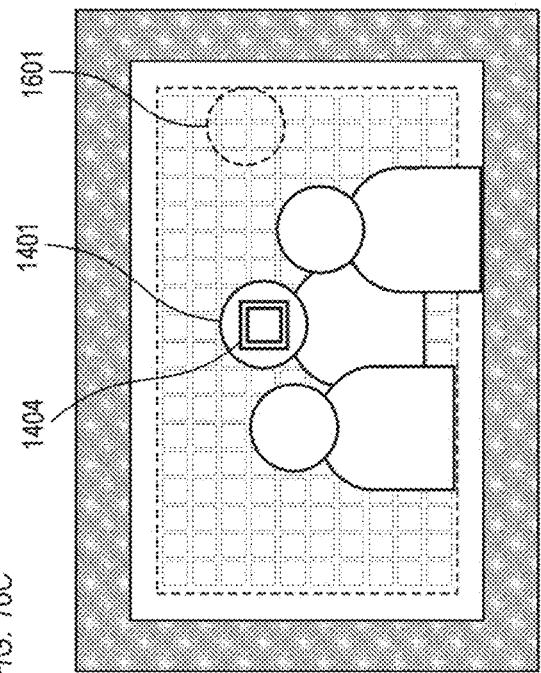

FIG. 16C shows a state in which the user's line of sight has moved to the line-of-sight position 1601 different from the object 1401 from the state in which focus is locked on the object 1401 in FIG. 16B. While focus is locked on the object 1401, the CPU 3 maintains the display of the icon 1404 indicating that the object 1401 is in focus, even when the user's line of sight is moved to the line-of-sight position 1601. Since there is no object in the vicinity of the line-of-sight position 1601, the CPU 3 does not display an icon indicating the object to which the user's line of sight is directed (first item) or an icon indicating the line-of-sight position (second item).

FIG. 16D shows a state in which the user's line of sight has moved to the line-of-sight position 1602 from the state in FIG. 16C. Since focus is locked on the object 1401, the CPU 3 maintains the display of the icon 1404 indicating that the object 1401 is in focus, even when the user's line-of-sight is moved to the line-of-sight position 1601. Also, the CPU 3 displays an icon 1604 indicating the object to which the user's line of sight is directed, on the object 1603 that is in the vicinity of the line-of-sight position 1602. By displaying the icon 1404 indicating the focus position and the icon 1604 indicating the estimated object, the CPU 3 can notify the user of another desired object to which the user's line of sight is directed, in addition to the focus position.

Although the focus lock function generally operates when the autofocus mode is the one-shot mode, the second embodiment is also applicable to other modes such as the servo mode. For example, if the user shifts his/her line of sight to another object while the object 1401 is in focus in the servo mode, the CPU 3 may control the display of each icon in the same manner as the process described in FIGS. 16C and 16D.

At step S8510, the object in focus is moving at a constant speed, and the CPU 3 determines whether the line-of-sight position is at a position different from the object in focus (a state in which focus tracking is successful for a moving object). If the line-of-sight position is at a position different from the object of focus lock target, the process proceeds to step S8511. If the line-of-sight position is at the position of the object in focus, the process proceeds to step S8513.

At step S8511, the CPU 3 determines whether an object different from the object for which focus tracking has been successful is present in the vicinity of the line-of-sight position. If an object is present in the vicinity of the line-of-sight position, the process proceeds to step S8512. If there is no object in the vicinity of the line-of-sight position, the process proceeds to step S8513.

At step S8512, the CPU 3 determines to "display icon". At step S8513, the CPU 3 determines to "hide icon". When the user is looking at an object that is different from the object that is moving at a constant speed and successfully tracked and focused, the CPU 3 notifies the user of the object to which the user's line of sight is directed, by displaying an icon indicating the estimated object.

Figure 17A:
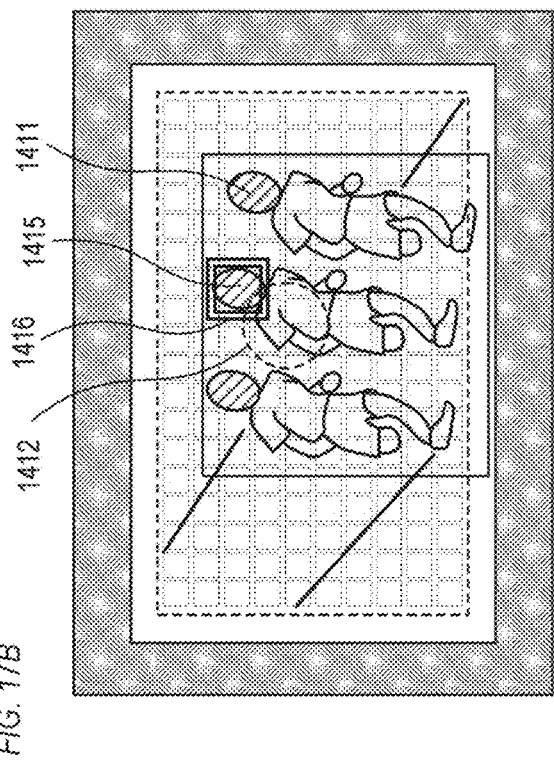
FIGS. 17A to 17C are diagrams illustrating icon display in a focus tracking state.
Figure 17B:
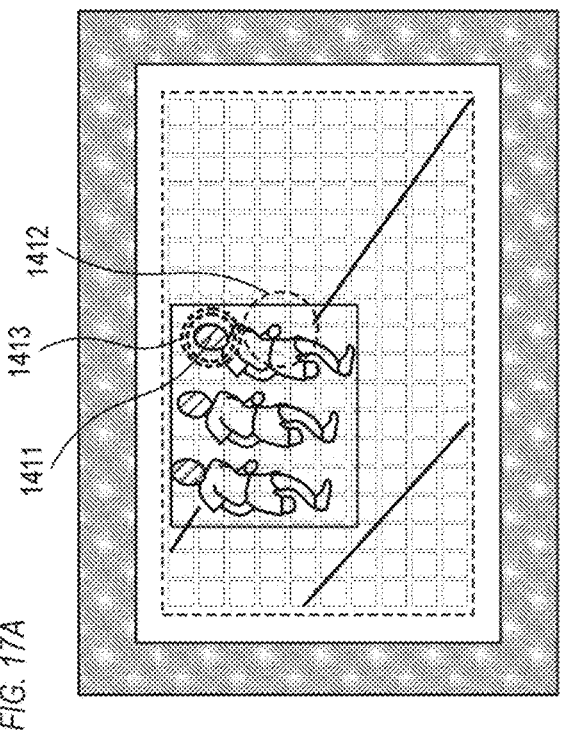
Figure 17C:
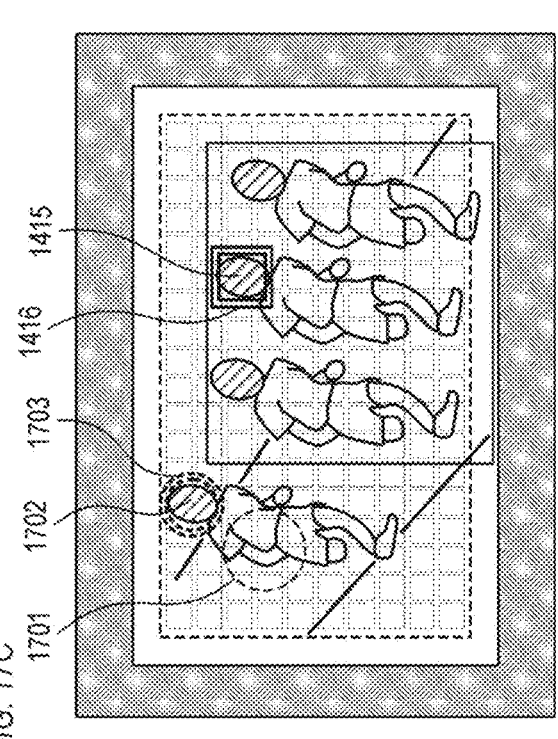

FIGS. 17A to 17C are diagrams illustrating icon display in a focus tracking state. The object 1411, line-of-sight position 1412, icon 1413, object 1415, and icon 1416 in FIGS. 17A and 17B are the same as those in FIGS. 14C and 14D of the first embodiment. The object 1411 and the object 1415 are traveling at a constant speed (moving at a constant speed), and in FIG. 17B, the object 1415 in the vicinity of the line-of-sight position 1412 is in focus. The CPU 3 displays an icon 1416 indicating that the object 1415 is in focus, and hides the icon indicating the object to which the user's line of sight is directed (the object 1415 in FIG. 17B).

In FIG. 17C, the CPU 3 performs a focus position tracking or prediction operation on the object 1415 in a servo AF mode (a mode in which focusing is maintained according to the movement of the object), for example. FIG. 17C shows a state in which the user's line of sight has moved to the line-of-sight position 1701 while the object 1415 is in focus and focus tracking is successful.

While the object 1415 is successfully tracked and focused, the CPU 3 maintains the display of the icon 1416 indicating that the object 1415 is in focus, even when the user's line of sight is moved to the line-of-sight position 1701. Also, the CPU 3 displays an icon 1703 indicating the object to which the user's line of sight is directed, on the object 1702 that is in the vicinity of the line-of-sight position 1701. By displaying the icon 1416 indicating the focus position and the icon 1703 indicating the estimated object, the CPU 3 can notify the user of another desired object to which the user's line of sight is directed, in addition to the focus position.

According to the second embodiment described above, in a situation where an object is in focus and the icon indicating that this object is the estimated object is hidden, the camera 1 displays, in response to a shift of the user's line of sight to another object, an icon indicating that another object is the estimated object. That is, in a state in which an object in the vicinity of the line-of-sight position is in focus or tracked and focused, the camera 1 hides the icon indicating the object to which the line of sight is directed, to improve visibility. Then, when the user shifts his/her line of sight to another object, the camera 1 displays an icon indicating the object to which the user's line of sight is directed (estimated object) on the object in the vicinity of the line-of-sight position. When the user directs his/her line of sight to another object while an object is in focus or tracked and focused, the camera 1 display the icon indicating the estimated object, thereby achieving both the assurance of visibility and enhanced operability.

It should be noted that the above embodiments are merely examples, and the present invention also includes configurations obtained by appropriately modifying or changing the configurations of the above embodiments within the scope of the present invention. The present invention also includes configurations obtained by appropriately combining configurations of the embodiments described above.

For example, although an example has been described in which an object is viewed through an electronic viewfinder (EVF), the present invention is also applicable to a situation where an object is viewed through an optical viewfinder (OVF). The present invention is applicable to devices other than image-capturing devices (cameras), and is also applicable to viewing three-dimensional computer graphics. The present invention is applicable to various electronic devices that can detect gaze points.

Examples of Application to Other Electronic Devices

Figure 18A:
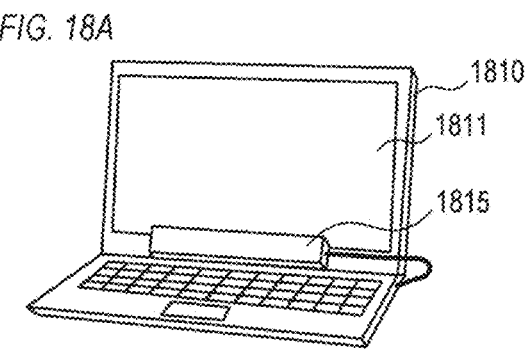
FIGS. 18A to 18C are external views of other electronic devices.

FIG. 18A is an external view of a notebook personal computer 1810 (notebook PC). In FIG. 18A, an image-capturing unit 1815 that captures an image of the user looking at a display unit 1811 of the notebook PC 1810 is connected to the notebook PC 1810, and the notebook PC 1810 obtains an image-capturing result from the image-capturing unit 1815. The notebook PC 1810 then detects the user's gaze point on the basis of the image-capturing result. The present invention is also applicable to the notebook PC 1810.

Figure 18B:
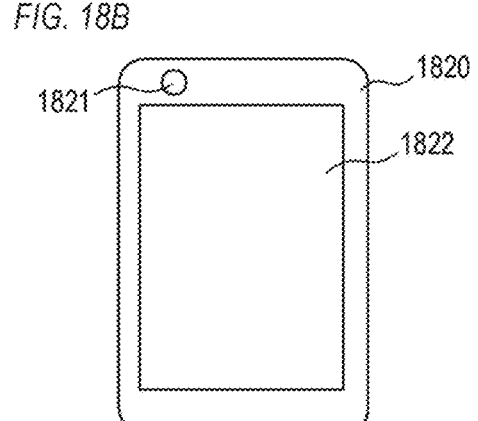

FIG. 18B is an external view of a smartphone 1820. In FIG. 18B, the smartphone 1820 detects the gaze point of the user looking at a display unit 1822 of the smartphone 1820 on the basis of the image-capturing result of a front-facing camera 1821 (front camera). The present invention is also applicable to the smartphone 1820. Similarly, the present invention is also applicable to various tablet terminals.

Figure 18C:
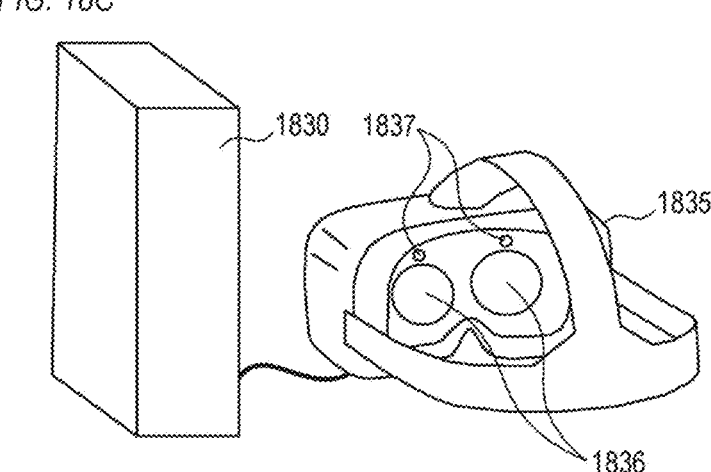

FIG. 18C is an external view of a game machine 1830. In FIG. 18C, a head-mounted display 1835 (HMD) that displays virtual reality (VR) images of games on a display unit

1836 is connected to the game machine 1830. The HMD 1835 has cameras 1837 that capture images of the eyes of the user wearing the HMD 1835, and the game machine 1830 obtains the image-capturing results from the HMD 1835. Then, the game machine 1830 detects the user's gaze point on the basis of the image-capturing result. The present invention is also applicable to game machine 1830. The components of the game machine 1830 may be built into the HMD 1835. As such, the present invention is also applicable to the HMD 1835. In the same manner that the present invention is applicable to viewing VR images displayed on an HMD, the present invention is also applicable to Augmented Reality (AR) images displayed on the lens unit of an eyeglasses-type wearable terminal, or to view the real object beyond the lens unit. In the same manner that the present invention is applicable to VR technology and AR technology, the present invention is also applicable to other xR technologies such as Mixed Reality (MR) technology and Substitutional Reality (SR) technology.

According to the present invention, an electronic device is provided that achieves both the display of line-of-sight position and the assurance of image visibility.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-087182, filed on May 26, 2023, which is hereby incorporated by reference herein in its entirety.

What is claimed is:
1. An electronic device comprising:
a processor; and a memory storing a program which, when executed by the processor, causes the electronic device to obtain information on a line-of-sight position of a user looking at a captured image, estimate, on a basis of the line-of-sight position of the user, an object to which a line of sight of the user is directed, and control, on a basis of at least one of a state of capturing the image or a state of an object in the image, whether to display a first item that indicates the estimated object, wherein in a case of a failure in obtainment of information on the line-of-sight position of the user, control is performed such that the first item is not displayed on a first image which is the image if the first item is not displayed on a second image captured before the first image, and the first item is displayed on the first image at a same position as in the second image if the first item is displayed on the second image.

2. The electronic device according to claim 1, wherein in a case where the line-of-sight position of the user is located at a position away from the object in the image, control is performed to display a second item that indicates the line-of-sight position of the user.

3. The electronic device according to claim 1, wherein control is performed to display the first item in a case where:

the user is paying attention to the estimated object;

an imaging area of the image is changed; or an orientation of an image-capturing device that captures the image is changed.

4. The electronic device according to claim 3, wherein in a case where a movement amount of the line-of-sight position of the user in a predetermined time is less than a first threshold, or a case where a number of blinks in a predetermined time is less than a second threshold, it is determined that the user is paying attention to the estimated object.

5. The electronic device according to claim 3, wherein in a case where a zoom operation is performed, or a case where an amount of change in focal length caused by the zoom operation is greater than a third threshold, or a case where an amount of change in zoom magnification caused by the zoom operation is greater than a fourth threshold, it is determined that the imaging area of the image is changed.

6. The electronic device according to claim 3, wherein in a case where a pan operation or a tilt operation is performed, or a case where a movement amount of the imaging area caused by the pan operation or the tilt operation is greater than a fifth threshold, it is determined that the imaging area of the image is changed.

7. The electronic device according to claim 3, wherein in a state in which information on the line-of-sight position of the user is obtained, it is determined whether the orientation of the image-capturing device is changed.

8. The electronic device according to claim 1, wherein control is performed to display the first item in a case where:

a number of objects in the image changes;

the number of objects in the image is two or more;

the estimated object is in accelerating or decelerating motion; or the estimated object is not in focus.

9. The electronic device according to claim 8, wherein the number of objects is a number of objects of a predetermined type among objects in the image.

10. The electronic device according to claim 8, wherein the number of objects is a number of objects detected in an area including the estimated object.

11. The electronic device according to claim 10, wherein the area including the estimated object is determined on a basis of at least one of, when capturing the image, a focal length, a shooting distance or shooting mode information, or a size of the estimated object.

12. The electronic device according to claim 8, wherein in a case where the estimated object is in focus and the line-of-sight position of the user is detected on an object different from the object in focus, control is performed to display the first item.

13. The electronic device according to claim 1, wherein in a case where the obtainment of information on the line-of-sight position of the user fails and the first item is to be displayed on the image, display the first item, control is performed to display the first item in a different manner from a case where the obtainment of information on the line-of-sight position of the user is successful.

14. A control method of an electronic device, comprising:

obtaining information on a line-of-sight position of a user looking at a captured image, estimating, on a basis of the line-of-sight position of the user, an object to which a line of sight of the user is directed, and controlling, on a basis of at least one of a state of capturing the image or a state of an object in the image, whether to display a first item that indicates the estimated object, wherein in a case of a failure in obtainment of information on the line-of-sight position of the user, control is performed such that the first item is not displayed on a first image which is the image if the first item is not displayed on a second image captured before the first image, and the first item is displayed on the first image at a same position as in the second image if the first item is displayed on the second image.

15. A non-transitory computer readable medium that stores a program, wherein the program causes a computer to execute a control method of an electronic device, the control method comprising:

obtaining information on a line-of-sight position of a user looking at a captured image, estimating, on a basis of the line-of-sight position of the user, an object to which a line of sight of the user is directed, and controlling, on a basis of at least one of a state of capturing the image or a state of an object in the image, whether to display a first item that indicates the estimated object, wherein in a case of a failure in obtainment of information on the line-of-sight position of the user, control is performed such that the first item is not displayed on a first image which is the image if the first item is not displayed on a second image captured before the first image, and the first item is displayed on the first image at a same position as in the second image if the first item is displayed on the second image.

* * * * *